United States Patent
Komatsu et al.

(10) Patent No.: US 9,535,239 B2
(45) Date of Patent: Jan. 3, 2017

(54) ZOOM LENS AND IMAGING APPARATUS

(71) Applicant: FUJIFILM Corporation, Tokyo (JP)

(72) Inventors: Daiki Komatsu, Saitama-ken (JP); Michio Cho, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 18 days.

(21) Appl. No.: 14/753,790

(22) Filed: Jun. 29, 2015

(65) Prior Publication Data

US 2015/0301319 A1    Oct. 22, 2015

Related U.S. Application Data

(63) Continuation of application No. PCT/JP2013/007643, filed on Dec. 26, 2013.

(30) Foreign Application Priority Data

Jan. 22, 2013    (JP) .................... 2013-008848

(51) Int. Cl.
  *G02B 15/14*    (2006.01)
  *G02B 15/17*    (2006.01)
  *G02B 27/10*    (2006.01)
  G02B 13/18    (2006.01)
  G02B 15/20    (2006.01)

(52) U.S. Cl.
  CPC ............... *G02B 15/14* (2013.01); *G02B 15/17* (2013.01); *G02B 27/1013* (2013.01); *G02B 13/18* (2013.01); *G02B 15/20* (2013.01)

(58) Field of Classification Search
  CPC ...... G02B 15/173; G02B 15/177; G02B 15/14
  USPC ................................ 359/684, 676
  See application file for complete search history.

(56) References Cited

U.S. PATENT DOCUMENTS

| 5,666,229 A | 9/1997 | Ohtake |
| 5,808,809 A | 9/1998 | Yahagi |
| 6,084,721 A | 7/2000 | Terasawa |
| 6,278,559 B1 | 8/2001 | Yahagi |
| 2008/0144188 A1 | 6/2008 | Hamano |
| 2011/0090373 A1 | 4/2011 | Wakazono |
| 2012/0262798 A1 | 10/2012 | Takemoto et al. |

FOREIGN PATENT DOCUMENTS

| JP | 07-253539 | 10/1995 |
| JP | 10-31157 | 2/1998 |

(Continued)

OTHER PUBLICATIONS

International Search Report, PCT/JP2013/007643, Apr. 8, 2014.

*Primary Examiner* — James Greece
(74) *Attorney, Agent, or Firm* — Young & Thompson

(57) ABSTRACT

A zoom lens consists of, in order from the object side, a positive first lens group, a negative second lens group, a negative third lens group, a negative fourth lens group, a positive fifth lens group, and a positive sixth lens group. The first lens group and the sixth lens group are fixed with respect to an image plane, and a distance between the first lens group and the second lens group increases, a distance between the second lens group and the third lens group changes, and a distance between the third lens group and the fourth lens group changes, and a distance between the fourth lens group and the fifth lens group changes, and a distance between the fifth lens group and the sixth lens group changes during magnification change from a wide angle end to a telephoto end.

15 Claims, 10 Drawing Sheets

(56) References Cited

FOREIGN PATENT DOCUMENTS

| | | |
|---|---|---|
| JP | 10-268194 | 10/1998 |
| JP | 11-72705 | 3/1999 |
| JP | 11-160620 | 6/1999 |
| JP | 2000-267003 | 9/2000 |
| JP | 2008-151846 | 7/2008 |
| JP | 2009-128491 | 6/2009 |
| JP | 2011-107693 | 6/2011 |
| JP | 2012-058607 | 3/2012 |
| JP | 2012-225988 | 11/2012 |

FIG.2 EXAMPLE 1

FIG.3 EXAMPLE 2

FIG.6
EXAMPLE 1
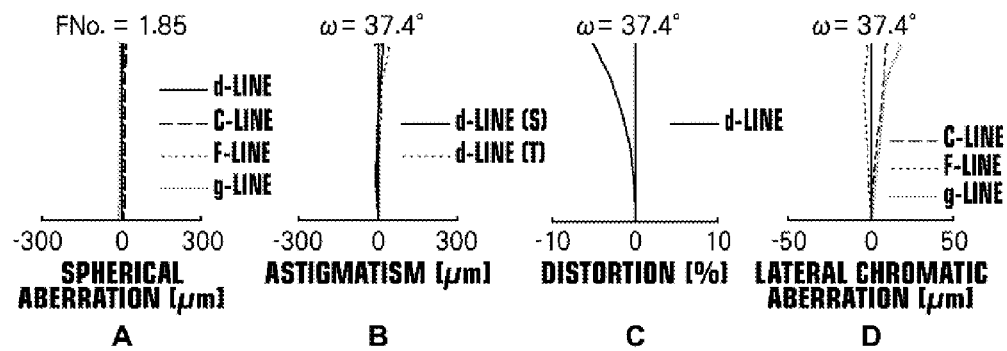
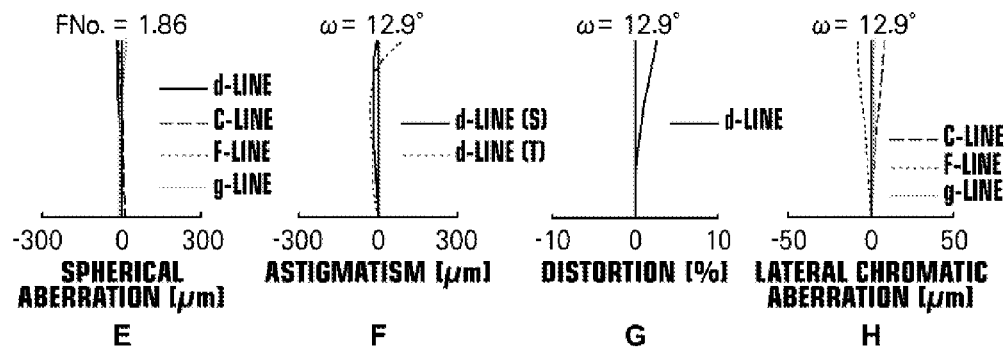
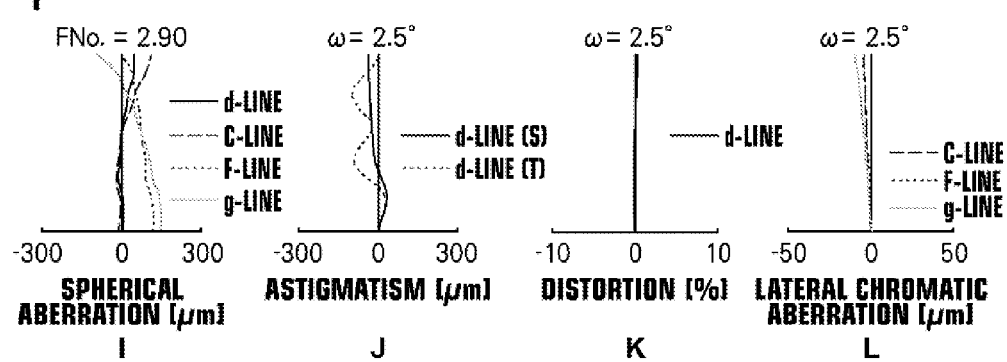

FIG.8
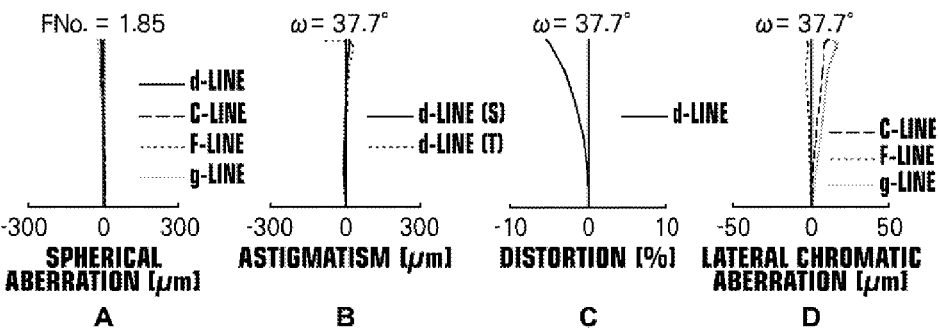
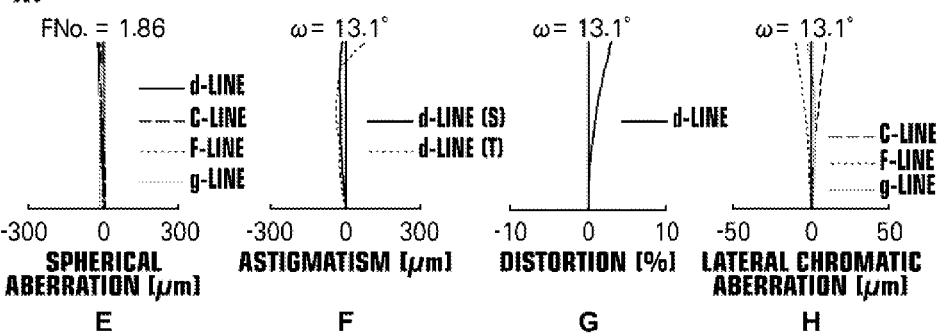
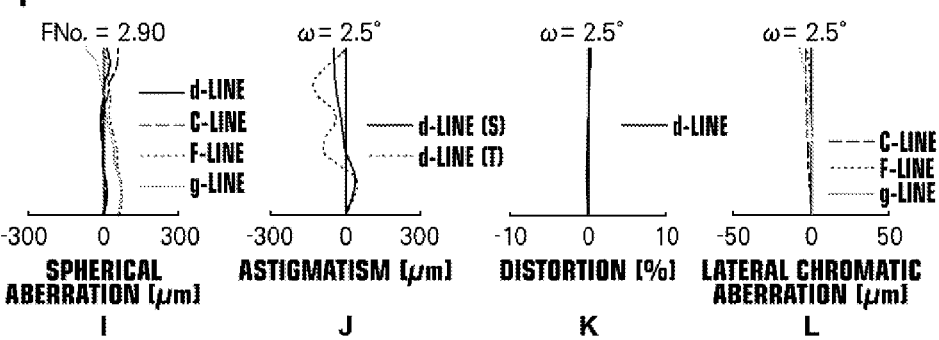

FIG.9
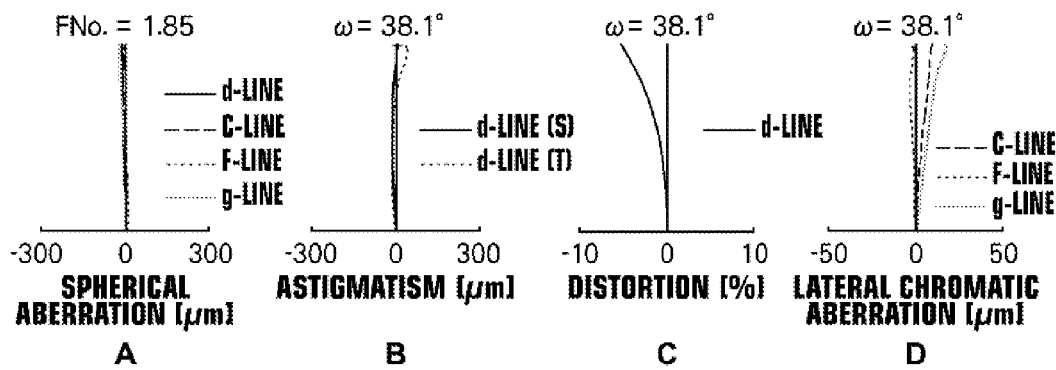
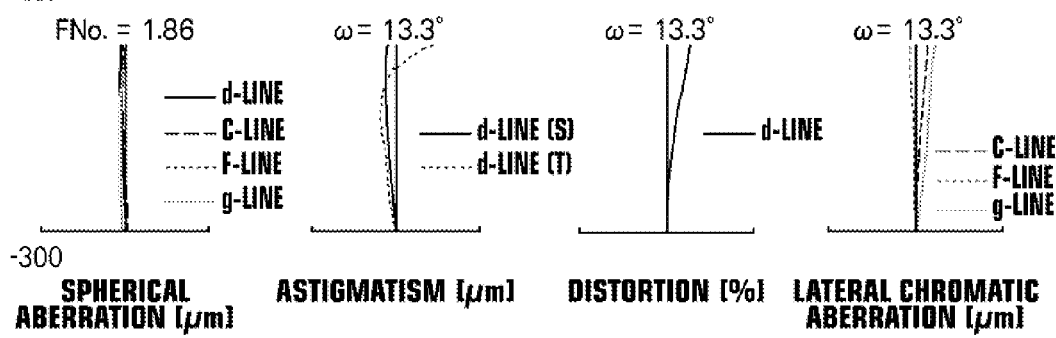
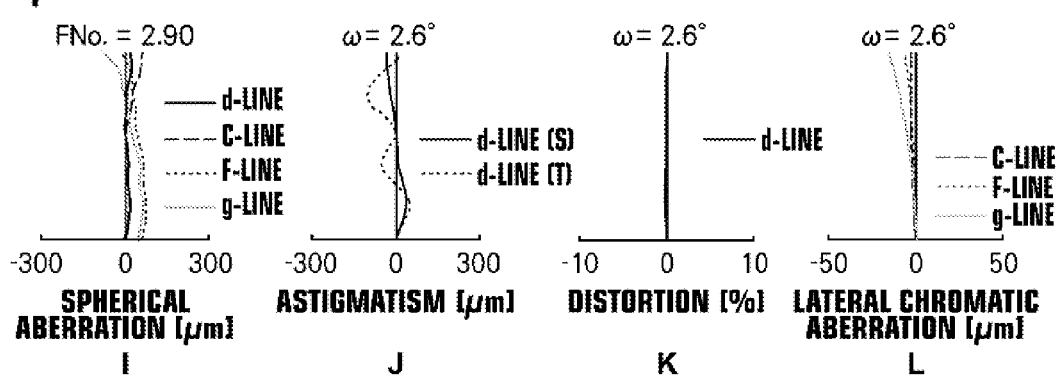

ZOOM LENS AND IMAGING APPARATUS

CROSS-REFERENCE TO RELATED APPLICATIONS

This application is a Continuation of PCT International Application No. PCT/JP2013/007643 filed on Dec. 26, 2013, which claims priority under 35 U.S.C §119(a) to Japanese Patent Application No. 2013-008848 filed on Jan. 22, 2013. Each of the above applications is hereby expressly incorporated by reference, in its entirety, into the present application.

BACKGROUND OF THE INVENTION

Field of the Invention

The present invention relates to a zoom lens and an imaging apparatus. In particular, the present invention relates to a zoom lens appropriate to be mounted on a digital camera, a camera for surveillance, a camera for film making, a camera for broadcasting and the like and an imaging apparatus including this zoom lens.

Description of the Related Art

Conventionally, as a zoom lens, and particularly as a zoom lens appropriate for a camera for film making and a camera for broadcasting, a zoom lens consisting of four lens groups has been widely known. In the zoom lens, the sign of the refractive power of each lens group is, in order from the object side, positive, negative, positive and positive, or positive, negative, negative and positive, and two of the four lens groups move relative to each other during magnification change. Further, a zoom lens in which the number of lens groups that move relative to each other during magnification change has been increased is also proposed. For example, Japanese Unexamined Patent Publication No. 10(1998)-031157 (Patent Document 1), Japanese Unexamined Patent Publication No. 2000-267003 (Patent Document 2), and Japanese Unexamined Patent Publication No. 2009-128491 (Patent Document 3) disclose a zoom lens consisting of five lens groups, and in which the sign of the refractive power of each lens group is, in order from the object side, positive, negative, negative, positive and positive, or positive, negative, positive, positive and positive. Further, Japanese Unexamined Patent Publication No. 10(1998)-268194 (Patent Document 4) and Japanese Unexamined Patent Publication No. 11(1999)-072705 (Patent Document 5) disclose a zoom lens consisting of six lens groups, and in which the sign of the refractive power of each lens group is, in order from the object side, positive, negative, positive, positive, negative and positive.

SUMMARY OF THE INVENTION

In cameras of recent years in the aforementioned fields, a lens system and an imaging device, such as a CCD (Charge Coupled Device), are generally used in combination. As the resolution of the imaging device has been becoming higher every year, higher performance of the lens system that can obtain high quality images is also needed to cope with the higher resolution of the imaging device. Further, the cameras of the aforementioned fields need to have small F-numbers so that excellent imaging is possible even under low illumination conditions, such as indoors. The number of lenses may be increased to achieve higher performance and a smaller F-number. However, a camera for film making, a camera for broadcasting and the like are often used by being placed on the shoulder of a user, or carried by the user. Therefore, an easy choice of increasing the size of the apparatus would be less likely to be acceptable in the market, and the apparatus needs to maintain its compactness.

To satisfy the aforementioned request of recent years, it is desirable that the zoom lenses disclosed in Patent Documents 1 and 2 have smaller F-numbers. Regarding the zoom lens disclosed in Patent Document 3, it is desirable that the total length of the lens system is reduced, and the lens system is made compact. Regarding the zoom lenses disclosed in Patent Documents 4 and 5, it is desirable that insufficient brightness on the telephoto side is improved, and that performance is further improved.

In view of the foregoing circumstances, it is an object of the present invention to provide a zoom lens that achieves a small F-number and higher performance while maintaining its compactness and also an imaging apparatus including such a zoom lens.

A zoom lens of the present invention consists essentially of six lens groups of, in order from the object side, a first lens group having positive refractive power, a second lens group having negative refractive power, a third lens group having negative refractive power, a fourth lens group having negative refractive power, a fifth lens group having positive refractive power, and a sixth lens group having positive refractive power. The first lens group and the sixth lens group are fixed with respect to an image plane, and a distance between the first lens group and the second lens group increases, a distance between the second lens group and the third lens group changes, and a distance between the third lens group and the fourth lens group changes, and a distance between the fourth lens group and the fifth lens group changes, and a distance between the fifth lens group and the sixth lens group changes during magnification change from a wide angle end to a telephoto end.

In the zoom lens of the present invention, it is desirable that one of the following conditional expressions (1) through (6), (4-1), (5-1) and (6-1) is satisfied. As a desirable mode, one of the conditional expressions (1) through (6), (4-1), (5-1) and (6-1) may be satisfied, or an arbitrary combination thereof may be satisfied:

$$D3T<D3W \quad (1);$$

$$D5T<D5W \quad (2);$$

$$D2W<D2T \quad (3);$$

$$0.8<f6/f5<1.3 \quad (4);$$

$$0.9<f6/f5<1.2 \quad (4\text{-}1);$$

$$1.5<ft/f1<3.0 \quad (5);$$

$$1.8<ft/f1<2.5 \quad (5\text{-}1);$$

$$-4.0<ft/f2<-0.5 \quad (6);$$

and $$-3.0<ft/f2<-0.6 \quad (6\text{-}1),$$

where

D3T is a distance in air on an optical axis between the third lens group and the fourth lens group at the telephoto end, D3W is a distance in air on the optical axis between the third lens group and the fourth lens group at the wide angle end, D5T is a distance in air on the optical axis between the fifth lens group and the sixth lens group at the telephoto end, D5W is a distance in air on the optical axis between the fifth lens group and the sixth lens group at the wide angle end, D2W is a distance in air on the optical axis between the second lens group and the third lens group at the wide angle end, D2T is a distance in air on the optical axis between the second lens group and the third lens group at the telephoto end, f6 is a focal length of the sixth lens group,
f5 is a focal length of the fifth lens group,
ft is a focal length of an entire system at the telephoto end,
f1 is a focal length of the first lens group, and
f2 is a focal length of the second lens group.

In the zoom lens of the present invention, it is desirable that a stop is arranged closer to the object side than a lens surface closest to the image side in the fifth lens group, and that the stop and the fifth lens group move as one body during magnification change from the wide angle end to the telephoto end.

In the zoom lens of the present invention, it is desirable that the second lens group consists essentially of a negative meniscus lens that includes at least one aspheric surface and has its concave surface facing the image side.

In the zoom lens of the present invention, it is desirable that the fifth lens group consists essentially of, in order from the object side, a biconvex lens and a cemented lens in which a biconvex lens and a biconcave lens are cemented together in order from the object side.

In the zoom lens of the present invention, it is desirable that the third lens group consists essentially of, in order from the object side, a negative meniscus lens with its concave surface facing the image side and two cemented lenses, or that the third lens group consists essentially of, in order from the object side, a negative meniscus lens with its concave surface facing the image side, a cemented lens, a positive lens and a negative lens. An imaging apparatus of the present invention includes the zoom lens of the present invention.

Here, the aforementioned each "lens group" does not necessary consist of plural lenses, but may consist of only one lens. Further, the phrase "consists essentially of" means that a lens having substantially no refractive power, an optical element, such as a stop, a cover glass and a filter, other than lenses, a mechanism part, such as a lens flange, a lens barrel, an imaging device and a hand-shake blur correction mechanism, and the like may be included in addition to the mentioned composition elements.

The sign of the refractive power and the shape of a lens surface are considered in a paraxial region when an aspheric surface is included. According to the zoom lens of the present invention, the zoom lens consists of six lens groups, and the arrangement of refractive power of the lens groups is appropriately set. Further, lens groups that are fixed during magnification change and a change in distance between the lens groups during magnification change are appropriately set. Therefore, a small F-number and higher performance are achievable while the compactness is maintained.

According to the imaging apparatus of the present invention, the imaging apparatus includes the zoom lens of the present invention. Therefore, high quality images are obtainable without increasing the size of the apparatus, and excellent imaging is possible even under low illumination conditions.

BRIEF DESCRIPTION OF THE DRAWINGS

FIG. 6, Sections A through L are aberration diagrams of the zoom lens in Example 1 of the present invention;

FIG. 8, Sections A through L are aberration diagrams of the zoom lens in Example 3 of the present invention;

FIG. 9, Sections A through L are aberration diagrams of the zoom lens in Example 4 of the present invention.

DESCRIPTION OF THE PREFERRED EMBODIMENTS

Figure 1:
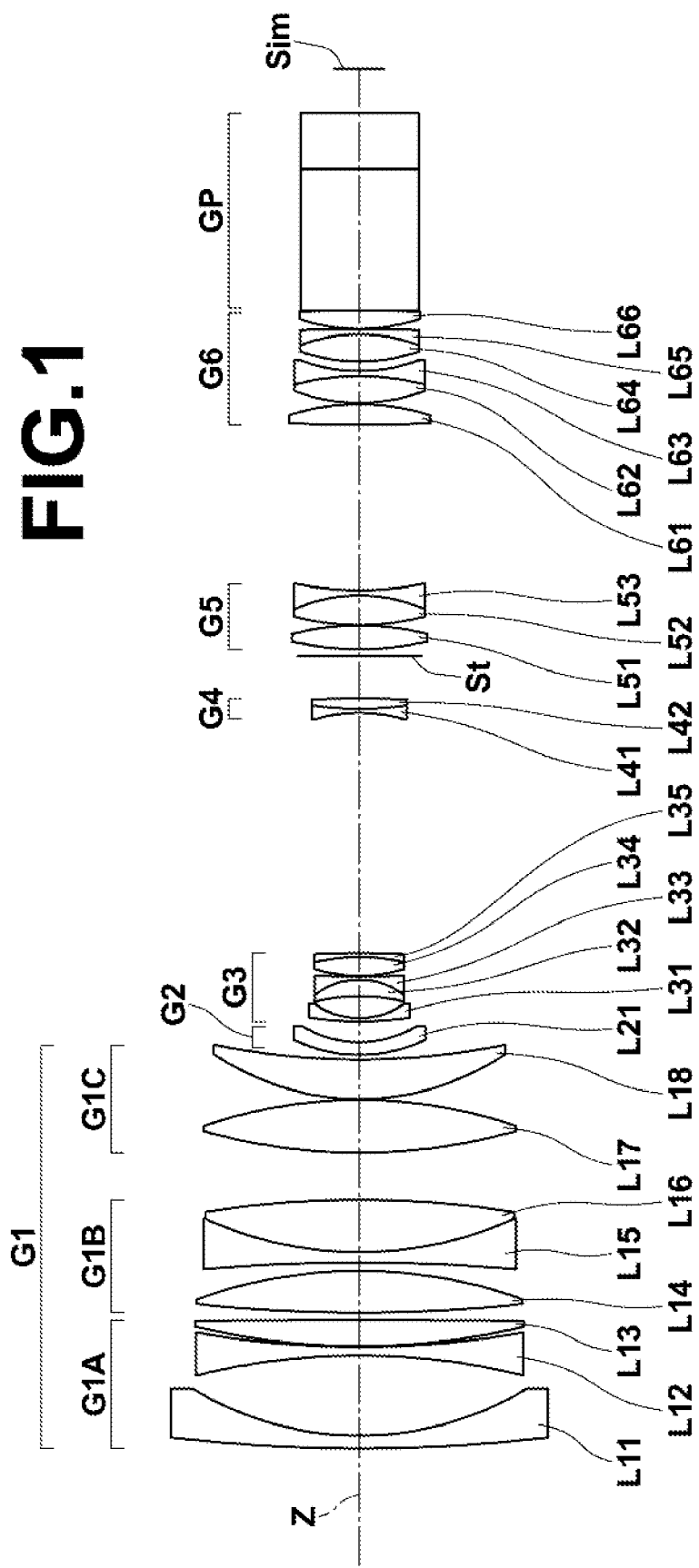
FIG. 1 is a sectional diagram illustrating the lens configuration of a zoom lens according to an embodiment of the present invention at a wide angle end.

Hereinafter, embodiments of the present invention will be described in detail with reference to drawings. FIG. 1 is a sectional diagram illustrating a zoom lens according to an embodiment of the present invention at a wide angle end. The example illustrated in FIG. 1 corresponds to Example 1, which will be described later.

A zoom lens according to an embodiment of the present invention consists essentially of six lens groups of, in order from the object side along optical axis, first lens group G1 having positive refractive power, second lens group G2 having negative refractive power, third lens group G3 having negative refractive power, fourth lens group G4 having negative refractive power, fifth lens group G5 having positive refractive power, and sixth lens group G6 having positive refractive power.

When a zoom lens is mounted on an imaging apparatus, it is desirable that the imaging apparatus is configured to include a cover glass for protecting an imaging surface of an imaging device, a prism, such as a color separation prism appropriate for the specification of the imaging apparatus, and various filters, such as a low-pass filter and an infrared-ray-cut filter. Therefore, FIG. 1 illustrates an example in which optical member GP, which is assumed to be these elements, is arranged between the lens system and image plane Sim. However, optical member GP is not an essential composition element of the zoom lens of the present invention.

The zoom lens according to the embodiment of the present invention is configured in such a manner that first lens group G1 and sixth lens group G6 are fixed with respect to image plane Sim, and a distance between first lens group G1 and second lens group G2 increases, a distance between second lens group G2 and third lens group G3 changes, and a distance between third lens group G3 and fourth lens group G4 changes, and a distance between fourth lens group G4 and fifth lens group G5 changes, and a distance between fifth lens group G5 and sixth lens group G6 changes during magnification change from the wide angle end to the telephoto end.

Meanwhile, conventionally, a four-group zoom lens of positive, negative, negative and positive refractive power type, which consists of, in order from the object side, a first lens group having positive refractive power, a second lens group having negative refractive power, a third lens group having negative refractive power and a fourth lens group having positive refractive power, was known. In the four-group zoom lens, the first lens group is fixed during magnification change, and the second lens group moves during magnification change. The third lens group moves during magnification change, and corrects movement of an image formation position caused by change in magnification, and the fourth lens group is fixed during magnification change.

In the zoom lens according to the embodiment of the present invention, a positive lens group, a negative lens group, a negative lens group, a negative lens group, a positive lens group and a positive lens group are arranged in order from the object side. Therefore, the zoom lens may be regarded as a zoom lens obtained by dividing each of the second lens group and the fourth lens group in the conventional four-group zoom lens of positive, negative, negative and positive refractive power type into two lens groups, and by making improvements. Schematically, the second lens group having negative refractive power in the conventional four-group zoom lens is divided to form second lens group G2 having negative refractive power and third lens group G3 having negative refractive power in the zoom lens according to the embodiment of the present invention. Further, the fourth lens group having positive refractive power in the conventional four-group zoom lens is divided to form fifth lens group G5 having positive refractive power and sixth lens group G6 having positive refractive power in the zoom lens according to the embodiment of the present invention.

In the embodiment of the present invention, when a conventional lens group is divided to form two lens groups, the two lens groups having the same sign of refractive power as that of the lens group before division are formed. Consequently, it is possible to excellently correct various aberrations without making the refractive power of each of the lens groups after division extremely strong. If the second lens group having negative refractive power in the conventional four-group zoom lens is divided to form two lens groups of a second lens group having negative refractive power and a third lens group having positive refractive power, it is necessary to make the negative refractive power of the second lens group after division strong, and excellent correction of various aberrations becomes difficult.

In the embodiment of the present invention, the second lens group in the conventional four-group zoom lens is divided to form two lens groups of second lens group G2 and third lens group G3, and these two lens groups are moved relative to each other during magnification change. Consequently, it is possible to suppress a fluctuation of various aberrations during magnification change.

Further, in the embodiment of the present invention, two lens groups of fifth lens group G5 and sixth lens group G6 are formed by dividing the fourth lens group in the conventional four-group zoom lens, which is fixed during magnification change. Further, the zoom lens in the embodiment of the present invention is configured in such a manner that the fifth lens group G5 moves during magnification change. Therefore, it is possible to provide long movement ranges in which second lens group G2, third lens group G3 and fourth lens group G4 are movable in the direction of the optical axis without making the total length of the lens system long. Therefore, it is possible to suppress the refractive power of each lens group while maintaining a high zoom ratio, and to easily correct various aberrations in an excellent manner. Further, since excellent correction of a spherical aberration and a longitudinal chromatic aberration also becomes easy, it is also possible to easily reduce an F-number.

According to the zoom lens in the embodiment of the present invention, which is configured as described above, a small F-number and excellent correction of various aberrations are achievable while the compactness and a high zoom ratio are maintained. Further, a fluctuation of various aberrations during magnification change is suppressed, and high optical performance that can obtain high quality images is achievable.

Zoom lens groups that move during magnification change may be three lens groups of second lens group G2, third lens group G3 and fifth lens group G5. Alternatively, three lens groups of second lens group G2, fourth lens group G4 and fifth lens group G5 may be moved. Alternatively, four lens groups of second lens group G2 through fifth lens group G5 may be moved. When four lens groups move during magnification change, it is possible to further suppress a fluctuation of various aberrations during magnification change.

It is desirable that the zoom lens according to the embodiment of the present invention satisfies one of the following conditional expressions (1) through (6), or an arbitrary combination thereof:

$$D3T < D3W \tag{1};$$

$$D5T < D5W \tag{2};$$

$$D2W < D2T \tag{3};$$

$$0.8 < f6/f5 < 1.3 \tag{4};$$

$$1.5 < ft/f1 < 3.0 \tag{5};$$

and $$-4.0 < ft/f2 < -0.5 \tag{6};$$

where

D3T is a distance in air on an optical axis between the third lens group and the fourth lens group at the telephoto end, D3W is a distance in air on the optical axis between the third lens group and the fourth lens group at the wide angle end, D5T is a distance in air on the optical axis between the fifth lens group and the sixth lens group at the telephoto end, D5W is a distance in air on the optical axis between the fifth lens group and the sixth lens group at the wide angle end, D2W is a distance in air on an optical axis between the second lens group and the third lens group at the wide angle end, D2T is a distance in air on the optical axis between the second lens group and the third lens group at the telephoto end, f6 is a focal length of the sixth lens group,
f5 is a focal length of the fifth lens group,
ft is a focal length of an entire system at the telephoto end,
f1 is a focal length of the first lens group, and f2 is a focal length of the second lens group.

When conditional expression (1) is satisfied, it is possible to make a distance in air on the optical axis between third lens group G3 and fourth lens group G4 at the telephoto end narrower than the distance at the wide angle end, and to make the zoom ratio high.

When conditional expression (2) is satisfied, it is possible to make a distance in air on the optical axis between fifth lens group G5 and sixth lens group G6 at the telephoto end narrower than the distance at the wide angle end. It is possible to provide long movement ranges in which second lens group G2, third lens group G3 and fourth lens group G4 are movable in the direction of the optical axis without making the total length of the lens system long. Therefore, it is possible to suppress the refractive power of each lens group while maintaining a high zoom ratio, and to easily correct various aberrations in an excellent manner. Further, since excellent correction of a spherical aberration and a longitudinal chromatic aberration also becomes easy, it is also possible to easily reduce an F-number.

When conditional expression (3) is satisfied, it is possible to make a distance in air on the optical axis between second lens group G2 and third lens group G3 at the wide angle end narrower than the distance at the telephoto end. That is advantageous to reduction in the effective diameter of a lens or lenses in first lens group G1 at the wide angle end, and excellent correction of a spherical aberration at the telephoto end.

If the lower limit of conditional expression (4) is not satisfied, the lens diameter of sixth lens group G6 becomes large. If the upper limit of conditional expression (4) is not satisfied, it becomes difficult to secure an appropriate length of back focus that is necessary to arrange a prism, a filter and the like between the lens system and image plane Sim. Further, since a focal length conversion optical system is inserted between fifth lens group G5 and sixth lens group G6 in some case, it is desirable that a combined optical system of first lens group G1 to fifth lens group G5 in combination is an approximately afocal optical system. However, if conditional expression (4) is not satisfied, it is difficult to make this combined optical system an approximately afocal optical system. When conditional expression (4) is satisfied, it is possible to suppress an increase in the lens diameter of sixth lens group G6, and to secure an appropriate length of back focus. Further, it is possible to convert a focal length by inserting a focal length conversion optical system between fifth lens group G5 and sixth lens group G6.

Therefore, it is more desirable that the following conditional expression (4-1) is satisfied instead of conditional expression (4):

$$0.9<f6/f5<1.2 \qquad (4\text{-}1).$$

If the lower limit of conditional expression (5) is not satisfied, the total length of the lens system increases. If the upper limit of conditional expression (5) is not satisfied, a spherical aberration at the telephoto end deteriorates. When conditional expression (5) is satisfied, reduction in the size of the lens system and excellent correction of a spherical aberration at the telephoto end become easy. Therefore, it is more desirable that the following conditional expression (5-1) is satisfied instead of conditional expression (5):

$$1.8<ft/f1<2.5 \qquad (5\text{-}1).$$

If the lower limit of conditional expression (6) is not satisfied, distortion at the wide angle end and curvature of field in a peripheral part of an image formation area deteriorate. If the upper limit of conditional expression (6) is not satisfied, the effect of correcting a fluctuation of aberrations during magnification change becomes weaker. When conditional expression (6) is satisfied, excellent correction of distortion at the wide angle end and curvature of field in a peripheral part of an image formation area and excellent correction of a fluctuation of aberrations during magnification change become easy.

Therefore, it is more desirable that the following conditional expression (6-1) is satisfied instead of conditional expression (6):

$$-3.0<ft/f2<-0.6 \qquad (6\text{-}1).$$

Each lens group constituting the zoom lens in the embodiment of the present invention may be configured, for example, as will be described next. First, first lens group G1 may consist, in order from the object side, 1A-th lens group G1A having negative refractive power, and which is fixed during focusing, 1B-th lens group G1B having positive refractive power, and which moves from the object side toward the image side during focusing from an object at infinity to an object at a short distance, and 1C-th lens group G1C having positive refractive power, and which is fixed during focusing. When this configuration is adopted, it is possible to suppress a fluctuation of aberrations and a fluctuation of magnification ratio during focusing.

For example, in the example illustrated in FIG. 1, first lens group G1 is configured to consist of the aforementioned three lens groups. 1A-th lens group G1A consists of, in order from the object side, lens L11, which is a negative meniscus lens with its concave surface facing the image side, lens L12, which is a biconcave lens, and lens L13, which is a biconvex lens. Further, 1B-th lens group G1B consists of, in order from the object side, lens L14, which is a biconvex lens, and a cemented lens in which lens L15, which is a biconcave lens, and lens L16, which is a biconvex lens, are cemented together in order from the object side. Further, 1C-th lens group G1C consists of, in order from the object side, lens L17, which is a biconvex lens, and lens L18, which is a positive meniscus lens with its convex surface facing the object side. Since 1B-th lens group G1B consists of, in order from the object side, a biconvex lens and a cemented lens in which a biconcave lens and a biconvex lens are cemented together, it is possible to more easily suppress a fluctuation of aberrations during focusing.

In first lens group G1, a lens closest to the object side may be an aspheric lens. In that case, it is possible to excellently correct distortion mainly at the wide angle end. In first lens group G1, a lens closest to the image side may be an aspheric lens. In that case, it is possible to suppress a spherical aberration at the telephoto end. For example, in the example illustrated in FIG. 1, a surface of lens L11 facing the object side and a surface of lens L18 facing the object side are aspheric surfaces.

When first lens group G1 consists of lens L11 through L18 as described above, lenses L16 and L17 may use anomalous dispersion material. In that case, it is possible to excellently correct, especially, chromatic aberrations on the telephoto side. When first lens group G1 consists of lens L11 through L18 as described above, the Abbe number of the material of lenses L16 and L17 for d-line may be set greater than 80. In that case, it is possible to excellently correct, especially, chromatic aberrations on the telephoto side.

It is desirable that second lens group G2 consists of a negative meniscus lens with its concave surface facing the image side. In that case, excellent correction of a spherical aberration on the telephoto side is easy. Further, it is desirable that second lens group G2 consists of a negative meniscus lens with its concave surface facing the image side, and includes at least one aspheric surface. In that case, excellent correction of distortion on the wide angle side is possible. Further, excellent correction of curvature of field is easy. For example, in the example illustrated in FIG. 1, second lens group G2 consists of only lens L21, which is a negative meniscus lens with its concave surface facing the image side.

It is desirable that third lens group G3 consists of, in order from the object side, a negative meniscus lens with its concave surface facing the image side and two cemented lenses. Alternatively, it is desirable that third lens group G3 consists of, in order from the object side, negative meniscus lens with its concave surface facing the image side, a cemented lens, a positive lens and a negative lens. When third lens group G3 adopts either of the aforementioned kinds of desirable configuration, it is possible to suppress a fluctuation of aberrations during magnification change. Here, each cemented lens in the aforementioned two kinds of desirable configuration of third lens group G3 includes a positive lens and a negative lens. It is desirable that a positive lens and a negative lens are cemented together in order from the object side in the cemented lens closer to the object side in the first configuration and the cemented lens in the second configuration. Consequently, it is possible to easily correct especially a spherical aberration on the telephoto side and curvature of field. Further, in the first configuration and the second configuration, it is desirable that two lenses of the first lens and the second lens from the image side are a positive lens and a negative lens in order from the object side. Consequently, it is possible to easily suppress a fluctuation of aberrations during magnification change.

For example, in the example illustrated in FIG. 1, third lens group G3 consists of, in order from the object side, lens L31, which is a negative meniscus lens with its concave surface facing the image side, a cemented lens in which lens L32, which is a positive meniscus lens with its convex surface facing the image side, and lens L33, which is a biconcave lens, are cemented together in order from the object side, and a cemented lens in which L34, which is a biconvex lens, and lens L35, which is a negative meniscus lens with its concave surface facing the object side, are cemented together in order from the object side.

For example, fourth lens group G4 may consist of a cemented lens including a positive lens and a negative lens. In that case, it is possible to contribute to suppression of a fluctuation of aberrations during magnification change while achieving reduction in the size of the zoom lens. For example, in the example illustrated in FIG. 1, fourth lens group G4 consists of a cemented lens in which lens L41, which is a biconcave lens, and lens L42, which is a biconvex lens, are cemented together in order from the object side.

It is desirable that fifth lens group G5 consists of, in order from the object side, a biconvex lens and a cemented lens in which a biconvex lens and a biconvex lens are cemented together in order from the object side. In that case, it is possible to excellently correct a spherical aberration and a longitudinal chromatic aberration.

For example, in the example illustrated in FIG. 1, fifth lens group G5 consists of, in order from the object side, lens L51, which is a biconvex lens, and a cemented lens in which lens L52, which is a biconvex lens, and lens L53, which is a biconcave lens, are cemented together in order from the object side.

In fifth lens group G5, a lens closest to the object side may be an aspheric lens. In that case, it is possible to suppress a spherical aberration, and advantageous to achievement a lens system having a small F-number. For example, in the example illustrated in FIG. 1, a surface of lens L51 facing the object side is an aspheric surface.

For example, sixth lens group G6 may consist of, in order from the object side, a positive lens, two cemented lenses and a positive lens. In the configuration adoptable by sixth lens group G6, each cemented lens includes a positive lens and a negative lens. The order of arrangement of the positive lens and negative lens from the object side in each cemented lens is not limited.

For example, in the example illustrated in FIG. 1, sixth lens group G6 consists of, in order from the object side, lens L61, which is a biconvex lens, a cemented in which lens L62, which is a biconvex lens, and lens L63, which is a biconcave lens, are cemented together in order from the object side, a cemented lens in which lens L64, which is a biconvex lens, and lens L65, which is a negative meniscus lens with its concave surface facing the object side, are cemented together in order from the object side and lens L66, which is a biconvex lens.

When sixth lens group G6 consists of lenses L61 through L66, as described above, lens L64 may use anomalous dispersion material. In that case, it is possible to excellently correct a longitudinal chromatic aberration. When sixth lens group G6 consists of lens L61 through L66 as described above, the Abbe number of the material of lens L64 for d-line may be set greater than 71. In that case, it is possible to excellently correct a longitudinal chromatic aberration.

Further, in the zoom lens according to the embodiment of the present invention, it is desirable that aperture stop St is arranged closer to the object side than a lens surface closest to the image side in fifth lens group G5, and that aperture stop St and fifth lens group G5 move as one body during magnification change from the wide angle end to the telephoto end. In that case, it is possible to prevent the effective diameter of lenses closer to the object side than aperture stop St from becoming large, and to provide a large movement amount for a lens group or groups that move during magnification change.

For example, in the example illustrated in FIG. 1, aperture stop St is arranged between fourth lens group G4 and fifth lens group G5. In that case, it is possible to easily move aperture stop St and fifth lens group G5 as one body during magnification change. Further, the arrangement is advantageous to suppression of an increase in the effective diameter of the lens. Here, aperture stop St illustrated in FIG. 1 does not represent the size nor the shape of the aperture stop, but the position of the aperture stop on the optical axis.

So far, the zoom lens of the present invention has been described with reference to the example illustrated in FIG. 1. In the zoom lens of the present invention, the number of a lens or lenses constituting each lens group and the lens shape are not limited to the example illustrated in FIG. 1. The zoom lens of the present invention may adopt other configuration. Further, the aforementioned desirable configuration and adoptable configuration may be combined in an arbitrary manner. It is desirable that the configuration is appropriately selected based on the specification requested in the zoom lens.

Next, specific examples of the zoom lens of the present invention will be described.

Example 1

Figure 2:
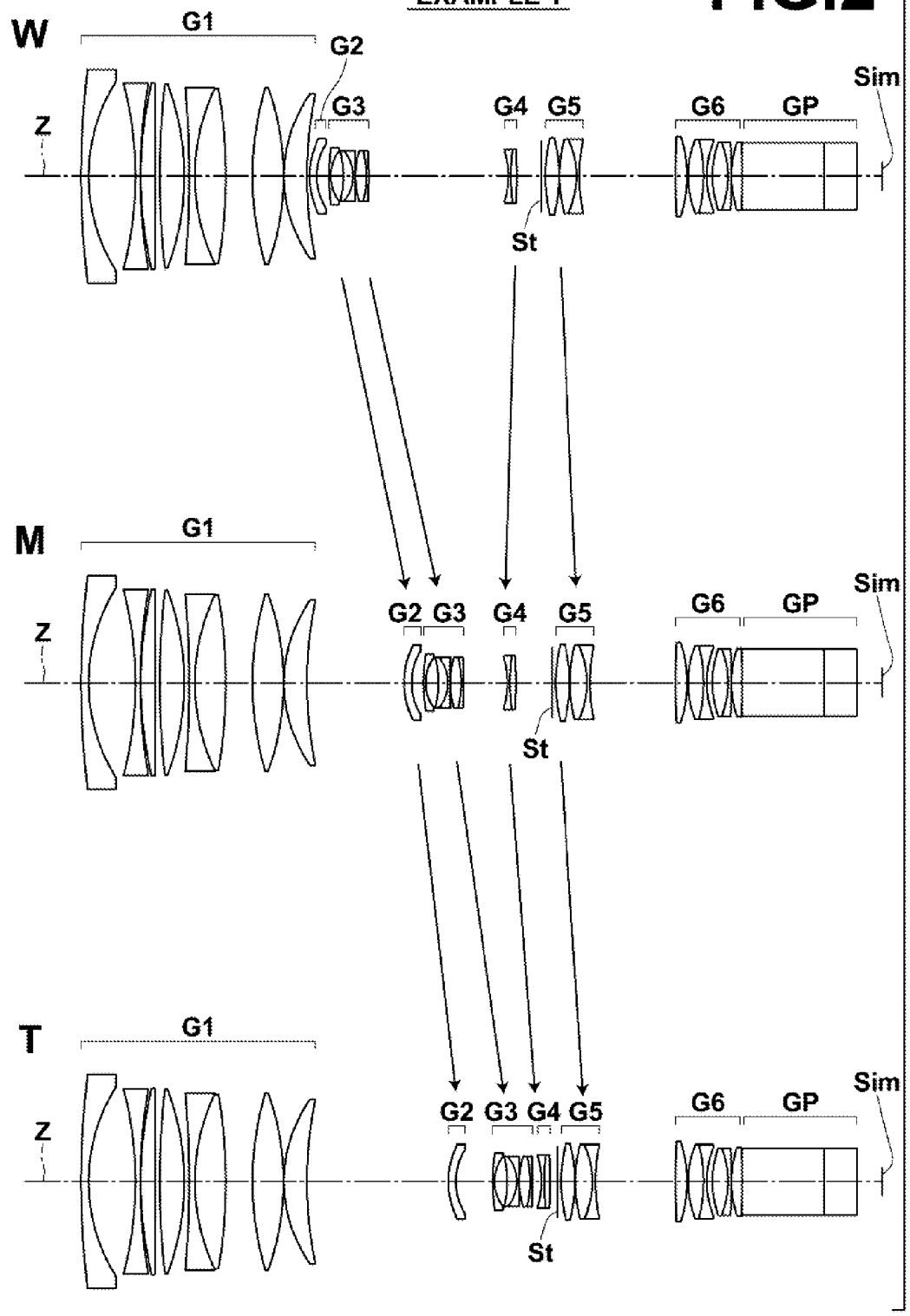
FIG. 2 is a sectional diagram illustrating the lens configuration of a zoom lens in Example 1 of the present invention.

FIG. 2 is a sectional diagram illustrating the configuration of a zoom lens in Example 1. In FIG. 2, a top row, a middle row and a bottom row to which signs W, M and T are attached to the left side of the diagram, respectively, illustrate the arrangement and configuration of each lens group at the wide angle end, a middle focal length state, and the telephoto end, respectively. Further, arrows illustrated between the top row and the middle row and arrows illustrated between the middle row and the bottom row schematically illustrate a path of movement of each lens group that moves during magnification change.

As the group configuration of the zoom lens in Example 1, the zoom lens consists of six lens groups of, in order from the object side, first lens group G1 having positive refractive power, second lens group G2 having negative refractive power, third lens group G3 having negative refractive power, fourth lens group G4 having negative refractive power, fifth lens group G5 having positive refractive power, and sixth lens group G6 having positive refractive power. The zoom lens is configured in such a manner that first lens group G1 and sixth lens group G6 are fixed with respect to image plane Sim, and a distance between first lens group G1 and second lens group G2 increases, a distance between second lens group G2 and third lens group G3 changes, and a distance between third lens group G3 and fourth lens group G4 changes, and a distance between fourth lens group G4 and fifth lens group G5 changes, and a distance between fifth lens group G5 and sixth lens group G6 changes, and aperture stop St and fifth lens group G5 move as one body during magnification change from the wide angle end to the telephoto end. While magnification is changed from the wide angle end to the telephoto end, four lens groups of second lens group G2 through fifth lens group G5 move in the direction of the optical axis.

The schematic configuration of lenses in each lens group and the position of aperture stop St in the zoom lens of Example 1 are as explained by using the example illustrated in FIG. 1 in the descriptions of embodiments. FIG. 2 also illustrates an example in which optical member GP, which is assumed to be a prism, various filters and the like, is arranged between sixth lens group G6 and image plane Sim.

Table 1 shows basic lens data of the zoom lens in Example 1. Table 2 shows specification and variable surface distances of the zoom lens in Example 1. Table 3 shows aspherical coefficients of the zoom lens in Example 1.

TABLE 1

| Si | Ri | Di | Ndj | vdj |
|---|---|---|---|---|
| *1 | 363.1238 | 3.00 | 1.81600 | 46.62 |
| 2 | 71.8591 | 18.75 | | |
| 3 | −150.0980 | 2.00 | 1.88300 | 40.76 |
| 4 | 210.3319 | 0.15 | | |
| 5 | 156.1701 | 6.10 | 1.84661 | 23.78 |
| 6 | −3197.8589 | 1.75 | | |
| 7 | 336.6981 | 9.83 | 1.48749 | 70.23 |
| 8 | −106.2608 | 1.99 | | |

TABLE 1-continued

| Si | Ri | Di | Ndj | vdj |
|---|---|---|---|---|
| 9 | −391.8710 | 2.30 | 1.63679 | 34.52 |
| 10 | 82.6871 | 12.34 | 1.49700 | 81.54 |
| 11 | −217.7373 | 10.99 | | |
| 12 | 128.0432 | 12.39 | 1.43387 | 95.20 |
| 13 | −106.3404 | 0.15 | | |
| *14 | 55.8755 | 9.28 | 1.59522 | 67.74 |
| 15 | 161.0771 | DD[15] | | |
| *16 | 32.8064 | 3.00 | 1.88300 | 40.76 |
| 17 | 24.5071 | DD[17] | | |
| 18 | 71.3087 | 0.80 | 1.89800 | 34.00 |
| 19 | 17.1168 | 5.09 | | |
| 20 | −39.7283 | 3.84 | 1.80809 | 22.76 |
| 21 | −16.0110 | 0.80 | 1.78800 | 47.37 |
| 22 | 350.4721 | 0.12 | | |
| 23 | 33.9027 | 4.44 | 1.58144 | 40.75 |
| 24 | −41.7614 | 0.90 | 1.75019 | 52.98 |
| 25 | −249.1193 | DD[25] | | |
| 26 | −35.4319 | 1.00 | 1.88300 | 40.76 |
| 27 | 75.7928 | 2.39 | 1.92286 | 18.90 |
| 28 | −221.8369 | DD[28] | | |
| 29(St) | ∞ | 1.51 | | |
| *30 | 59.7021 | 5.68 | 1.84456 | 43.54 |
| 31 | −59.4345 | 0.10 | | |
| 32 | 57.3105 | 6.90 | 1.56369 | 61.59 |
| 33 | −36.0687 | 1.20 | 1.83400 | 37.16 |
| 34 | 70.1594 | DD[34] | | |
| 35 | 283.5260 | 4.71 | 1.65116 | 54.53 |
| 36 | −51.2763 | 0.30 | | |
| 37 | 39.5810 | 6.34 | 1.54318 | 63.34 |
| 38 | −56.8716 | 1.20 | 1.88300 | 40.76 |
| 39 | 36.8037 | 2.30 | | |
| 40 | 41.7283 | 6.27 | 1.49700 | 81.54 |
| 41 | −37.6618 | 1.20 | 1.81341 | 39.94 |
| 42 | −471.3902 | 0.10 | | |
| 43 | 42.4218 | 4.33 | 1.59522 | 67.74 |
| 44 | −253.9690 | 0.00 | | |
| 45 | ∞ | 33.00 | 1.60859 | 46.44 |
| 46 | ∞ | 13.20 | 1.51633 | 64.10 |
| 47 | ∞ | 10.34 | | |

TABLE 2

| | WIDE ANGLE END | MIDDLE | TELEPHOTO END |
|---|---|---|---|
| ZOOM RATIO | 1.0 | 3.1 | 16.5 |
| f | 7.81 | 23.96 | 128.79 |
| Bf | 39.56 | 39.56 | 39.56 |
| FNo. | 1.85 | 1.86 | 2.90 |
| 2ω | 74.8 | 25.8 | 5.0 |
| DD[15] | 1.08 | 39.18 | 56.93 |
| DD[17] | 4.85 | 4.84 | 14.94 |
| DD[25] | 56.24 | 17.81 | 3.65 |
| DD[28] | 9.93 | 14.54 | 3.04 |
| DD[34] | 38.79 | 34.52 | 32.34 |

TABLE 3

| SURFACE NUMBER | 1 | 14 | 16 | 30 |
|---|---|---|---|---|
| KA | −1.1446585E+02 | 9.4548358E−01 | 1.0000000E+00 | 1.0000000E+00 |
| A3 | −4.7200354E−07 | 1.0995953E−08 | 8.4829637E−06 | −7.7231759E−07 |
| A4 | 1.5232490E−07 | −2.8962426E−07 | −2.4093719E−06 | −2.0311568E−06 |
| A5 | 1.0867916E−07 | 2.0638953E−08 | 3.0334991E−08 | −4.8204136E−08 |
| A6 | −1.4563200E−08 | −1.4973715E−09 | −4.3174749E−09 | 5.1847746E−09 |
| A7 | 9.4863433E−10 | 1.5986277E−11 | −3.8480689E−11 | −5.9761410E−11 |
| A8 | −3.2868810E−11 | 1.4911250E−12 | 8.6531737E−12 | −5.7808892E−12 |
| A9 | 5.2646019E−13 | 1.6942358E−13 | 2.7149516E−13 | −4.7353774E−14 |
| A10 | −5.0300263E−15 | −2.1381474E−14 | −2.1529049E−14 | 6.8941053E−15 |
| A11 | 4.1944611E−16 | 7.1639241E−16 | −3.2365538E−15 | 4.1453524E−16 |
| A12 | −2.0274039E−17 | −3.7044917E−18 | −9.4465216E−17 | 1.0184428E−17 |
| A13 | 3.5191474E−19 | −1.9011488E−19 | 9.2611757E−18 | −2.1690769E−19 |
| A14 | −2.2070767E−22 | −1.0749966E−21 | 2.8582737E−19 | −3.7285864E−20 |

TABLE 3-continued

| SURFACE NUMBER | 1 | 14 | 16 | 30 |
|---|---|---|---|---|
| A15 | −5.9721947E−23 | 1.4915997E−22 | 4.1177842E−20 | −1.9736606E−21 |
| A16 | 5.0004955E−25 | −1.6469097E−24 | −2.4623417E−21 | 6.6436118E−23 |

In Table 1, the column of Si shows the surface numbers of i-th (i=1, 2, 3, . . . ) surfaces that sequentially increase toward the image side when the object-side surface of a composition element closest to the object side is the first composition element. The column of Ri shows the curvature radius of the i-th surface. The column of Di shows a surface distance, on optical axis Z, between the i-th surface and the (i+1)th surface. Further, the column of Ndj shows the refractive index of a j-th (j=1, 2, 3, . . . ) composition element for d-line (wavelength is 587.56 nm) when the composition element closest to the object side is the first composition element and the value of j sequentially increases toward the image side. Further, the column of vdj shows the Abbe number of the j-th composition element for d-line.

In Table 1, the sign of a curvature radius is positive when the shape of a surface is convex toward the object side, and negative when the shape of a surface is convex toward the image side. Table 1 shows also aperture stop St and optical member GP. A surface number and the term "(St)" are written in the row of a surface number corresponding to aperture stop St. The value at the bottom of the column of Di is a distance between the image-side surface of optical member GP and image plane Sim.

In Table 1, DD[15], DD[17], DD[25], DD[28] and DD[34] written in the column of Di are variable surface distances that change during magnification change, and correspond to a distance between first lens group G1 and second lens group G2, a distance between second lens group G2 and third lens group G3, a distance between third lens group G3 and fourth lens group G4, a distance between fourth lens group G4 and aperture stop St, and a distance between fifth lens group G5 and sixth lens group G6, respectively.

Table 2 shows specification for d-line and the values of the aforementioned variable surface distances at the wide angle end, in a middle focal length state (which is written as "MIDDLE" for short in Table 2), and the telephoto end. In Table 2, f' represents the focal length of the entire system, and Br represents an air equivalent back focus, and FNo. represents an F-number, and 2ω represents a full angle of view (the unit is degree).

In Table 1, mark * is attached to the surface numbers of aspheric surfaces. The numerical value of a paraxial curvature radius is written in the row of the curvature radius of an aspheric surface. Table 3 shows aspherical coefficients for each of these aspheric surfaces. In the numerical values of the aspherical coefficients in Table 3, "E−n" (n: integer) means "×10$^{-n}$". The aspherical coefficients are the values of coefficients KA, Am (m=3, 4, 5, . . . 16) in an aspheric surface equation represented by the following equation. In the following equation, Σ means the sum about the term of m:

$$Zd = C \cdot h^2 / \{1 + (1 - KA \cdot C^2 \cdot h^2)^{1/2}\} + \Sigma Am \cdot h^m,$$

where

Zd: depth of aspheric surface (the length of a perpendicular from a point on the aspheric surface at height h to a flat plane that contacts with the vertex of the aspheric surface and is perpendicular to the optical axis), h: height (a length from the optical axis to the lens surface), C: a paraxial curvature, and KA, Am: aspherical coefficients (m=3, 4, 5, . . . 16).

Table 1 through Table 3 show values rounded at predetermined digits. In Table 1 through Table 3, mm is used as the unit of a length. However, since an optical system is usable by proportionally enlarging or proportionally reducing the optical system, other appropriate units may be used.

FIG. 6, Sections A through D are aberration diagrams illustrating a spherical aberration, astigmatism, distortion, and a lateral chromatic aberration of the zoom lens in Example 1 at the wide angle end, respectively. FIG. 6, Sections E through H are aberration diagrams illustrating a spherical aberration, astigmatism, distortion, and a lateral chromatic aberration of the zoom lens in Example 1 in a middle focal length state, respectively. FIG. 6, Sections I through L are aberration diagrams illustrating a spherical aberration, astigmatism, distortion, and a lateral chromatic aberration of the zoom lens in Example 1 at the telephoto end, respectively. All of FIG. 6, Sections A through L are aberration diagrams when the zoom lens is focused on an object at infinity. The signs of W, M and T attached to the left side of the top row, the middle row and the bottom row of FIG. 6 represent the wide angle end, the middle focal length state and the telephoto end, respectively.

Each of the aberration diagrams illustrates an aberration when d-line is a reference wavelength. The diagram of a spherical aberration illustrates aberrations also for C-line (wavelength is 656.27 nm), F-line (wavelength is 486.13 nm) and g-line (wavelength is 435.84 nm). The diagram of a lateral chromatic aberration illustrates aberrations also for C-line, F-line and g-line. In the diagram of astigmatism, an aberration in a sagittal direction is indicated by a solid line, and an aberration in a tangential direction is indicated by a broken line. Further, the sign (S) and the sign (T) are written to explain the line types. In the diagram of a spherical aberration, FNo. represents F-number, and in the other aberration diagrams, ω represents a half angle of view.

The signs, meaning and description method of data described in the explanation of Example 1 are similar also in the following examples, unless otherwise mentioned. Therefore, repetition of explanation will be omitted.

Example 2

Figure 3:
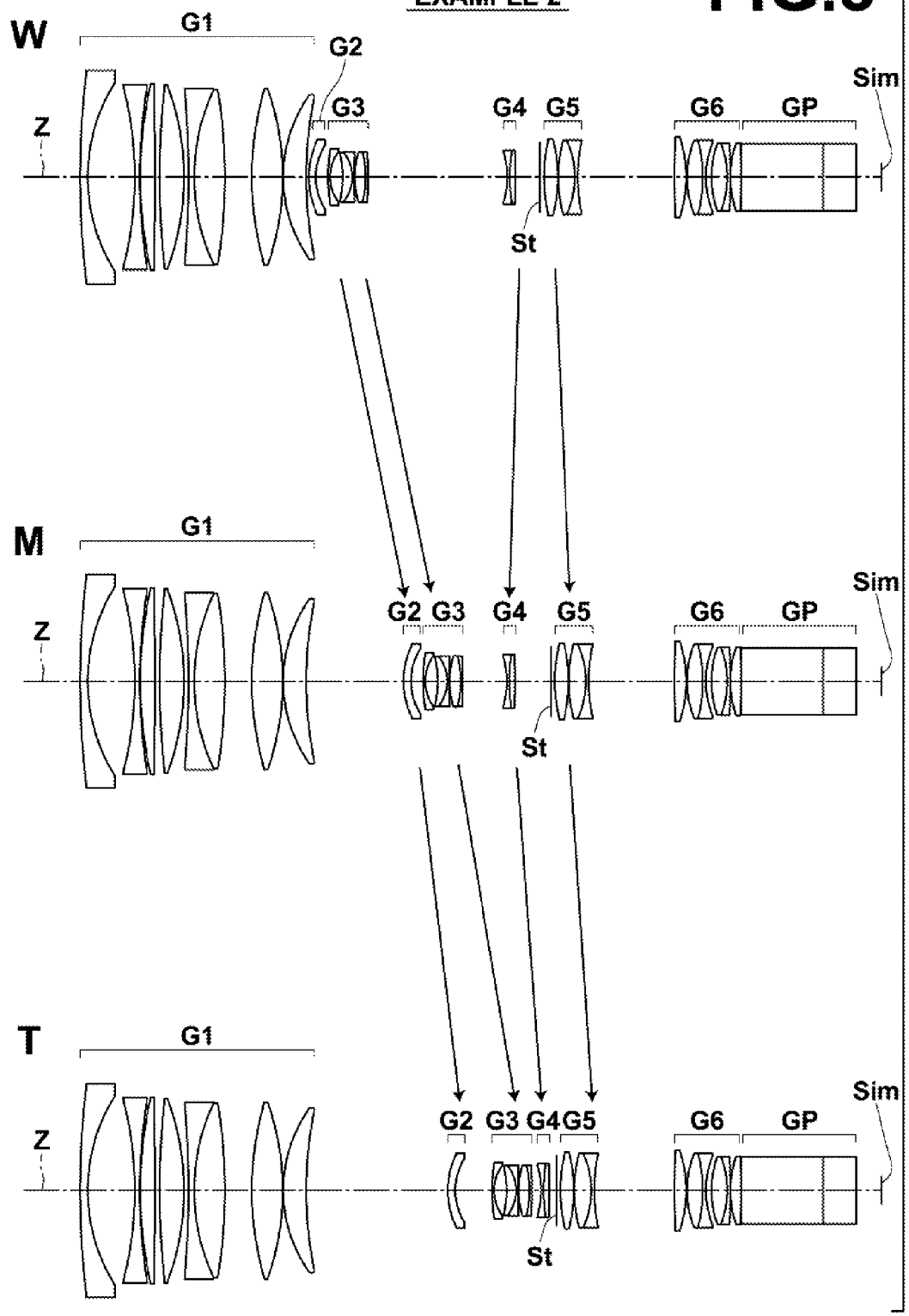
FIG. 3 is a sectional diagram illustrating the lens configuration of a zoom lens in Example 2 of the present invention.
Figure 7:
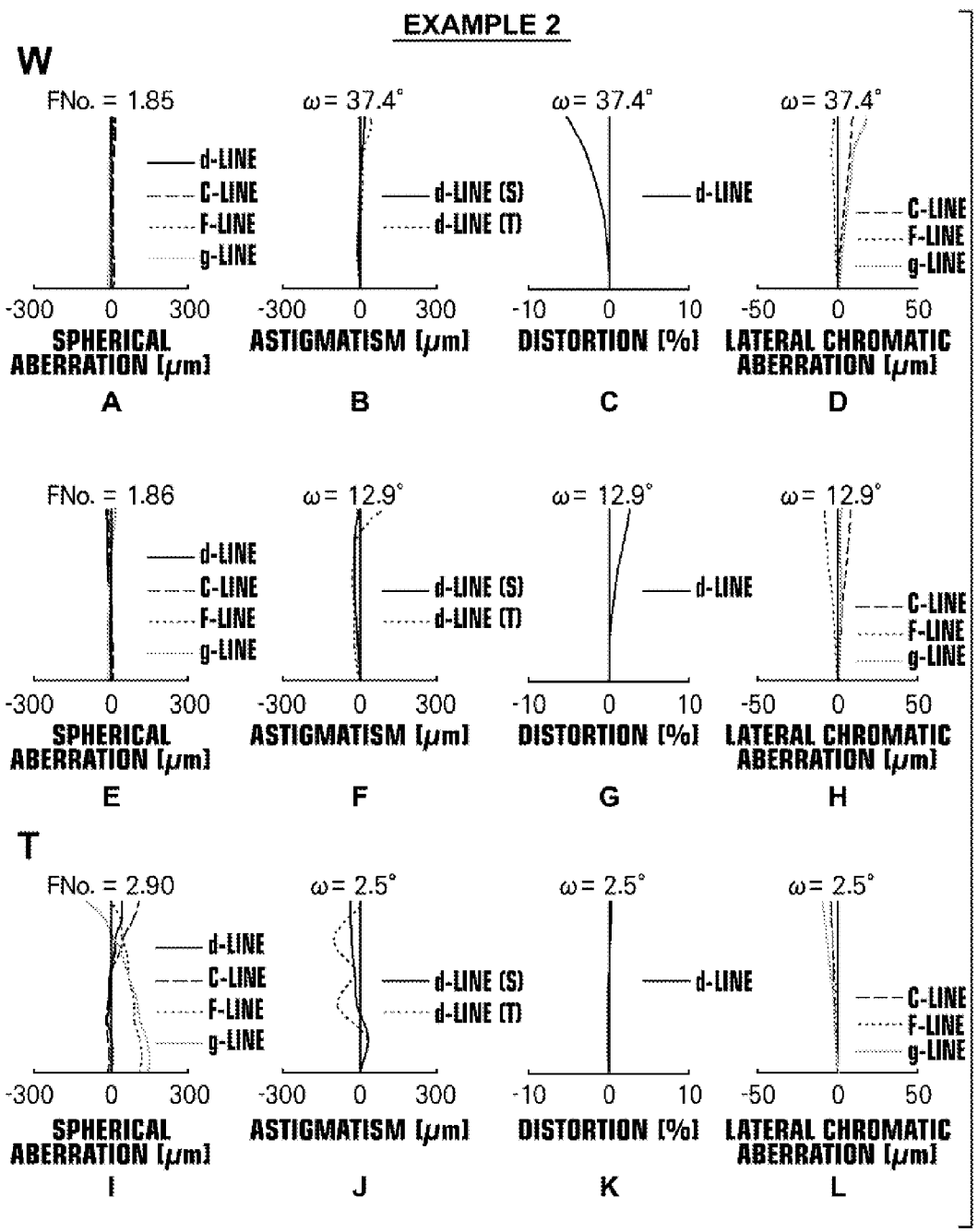
FIG. 7, Sections A through L are aberration diagrams of the zoom lens in Example 2 of the present invention.

FIG. 3 is a diagram illustrating the lens configuration of a zoom lens in Example 2. The group configuration, the schematic configuration of lenses in each lens group and the position of aperture stop St in the zoom lens of Example 2 are similar to those of Example 1, which have been described already. Table 4, Table 5 and Table 6 show the basic lens data, specification and variable surface distances, and aspherical coefficients of the zoom lens in Example 2, respectively. FIG. 7, Sections A through L are aberration diagrams of the zoom lens in Example 2.

TABLE 4

| Si | Ri | Di | Ndj | vdj |
|---|---|---|---|---|
| *1 | 363.3974 | 3.01 | 1.81600 | 46.62 |
| 2 | 71.5577 | 18.90 | | |
| 3 | −147.9050 | 2.00 | 1.88300 | 40.76 |
| 4 | 219.1943 | 0.15 | | |
| 5 | 159.5453 | 6.06 | 1.84661 | 23.78 |
| 6 | −2289.6352 | 2.00 | | |
| 7 | 342.8393 | 9.71 | 1.48749 | 70.23 |
| 8 | −106.5916 | 1.85 | | |
| 9 | −391.3977 | 2.30 | 1.63886 | 34.37 |
| 10 | 83.4781 | 12.29 | 1.49700 | 81.54 |
| 11 | −214.7287 | 11.03 | | |
| 12 | 127.8809 | 12.39 | 1.43387 | 95.20 |
| 13 | −106.5022 | 0.15 | | |
| *14 | 55.9266 | 9.25 | 1.59522 | 67.74 |
| 15 | 159.7509 | DD[15] | | |

TABLE 4-continued

| Si | Ri | Di | Ndj | vdj |
|---|---|---|---|---|
| *16 | 32.6470 | 3.00 | 1.88300 | 40.76 |
| 17 | 24.4041 | DD[17] | | |
| 18 | 71.6882 | 0.80 | 1.89800 | 34.00 |
| 19 | 17.0807 | 5.06 | | |
| 20 | −39.8272 | 3.82 | 1.80809 | 22.76 |
| 21 | −16.0492 | 0.80 | 1.78800 | 47.37 |
| 22 | 331.3321 | 0.15 | | |
| 23 | 33.7625 | 4.43 | 1.58144 | 40.75 |
| 24 | −41.9712 | 0.90 | 1.74422 | 53.58 |
| 25 | −247.6955 | DD[25] | | |
| 26 | −35.4670 | 1.00 | 1.88300 | 40.76 |
| 27 | 76.6202 | 2.30 | 1.92286 | 18.90 |
| 28 | −218.9177 | DD[28] | | |
| 29(St) | ∞ | 1.51 | | |
| *30 | 59.9970 | 5.66 | 1.84998 | 43.00 |
| 31 | −59.0221 | 0.10 | | |
| 32 | 58.3858 | 6.85 | 1.56143 | 62.64 |
| 33 | −35.7969 | 1.20 | 1.83400 | 37.16 |
| 34 | 71.0732 | DD[34] | | |
| 35 | 277.4870 | 4.74 | 1.64850 | 56.38 |
| 36 | −51.2301 | 0.30 | | |
| 37 | 39.8484 | 6.36 | 1.54145 | 63.41 |
| 38 | −56.5356 | 1.20 | 1.88300 | 40.76 |
| 39 | 36.6555 | 2.29 | | |
| 40 | 41.3006 | 6.29 | 1.49700 | 81.54 |
| 41 | −38.2712 | 1.20 | 1.81416 | 40.47 |
| 42 | −425.9881 | 0.10 | | |
| 43 | 42.6352 | 4.34 | 1.59522 | 67.74 |
| 44 | −253.6873 | 0.00 | | |
| 45 | ∞ | 33.00 | 1.60859 | 46.44 |
| 46 | ∞ | 13.20 | 1.51633 | 64.10 |
| 47 | ∞ | 10.35 | | |

TABLE 5

| | WIDE ANGLE END | MIDDLE | TELEPHOTO END |
|---|---|---|---|
| ZOOM RATIO | 1.0 | 3.1 | 16.5 |
| f | 7.80 | 23.95 | 128.74 |
| Bf | 39.57 | 39.57 | 39.57 |
| FNo. | 1.85 | 1.86 | 2.90 |
| 2ω | 74.8 | 25.8 | 5.0 |
| DD[15] | 1.06 | 39.25 | 57.03 |
| DD[17] | 4.94 | 4.88 | 14.94 |
| DD[25] | 56.13 | 17.79 | 3.73 |
| DD[28] | 9.87 | 14.48 | 2.90 |
| DD[34] | 38.96 | 34.56 | 32.36 |

TABLE 6

| SURFACE NUMBER | 1 | 14 | 16 | 30 |
|---|---|---|---|---|
| KA | −1.1446585E+02 | 9.4548358E−01 | 1.0000000E+00 | 1.0000000E+00 |
| A3 | −4.7200354E−07 | 1.0995953E−08 | 8.4829637E−06 | −7.7231759E−07 |
| A4 | 1.5232490E−07 | −2.8962426E−07 | −2.4093719E−06 | −2.0311568E−06 |
| A5 | 1.0867916E−07 | 2.0638953E−08 | 3.0334991E−08 | −4.8204136E−08 |
| A6 | −1.4563200E−08 | −1.4973715E−09 | −4.3174749E−09 | 5.1847746E−09 |
| A7 | 9.4863433E−10 | 1.5986277E−11 | −3.8480689E−11 | −5.9761410E−11 |
| A8 | −3.2868810E−11 | 1.4911250E−12 | 8.6531737E−12 | −5.7808892E−12 |
| A9 | 5.2646019E−13 | 1.6942358E−13 | 2.7149516E−13 | −4.7353774E−14 |
| A10 | −5.0300263E−15 | −2.1381474E−14 | −2.1529049E−14 | 6.8941053E−15 |
| A11 | 4.1944611E−16 | 7.1639241E−16 | −3.2365538E−15 | 4.1453524E−16 |
| A12 | −2.0274039E−17 | −3.7044917E−18 | −9.4465216E−17 | 1.0184428E−17 |
| A13 | 3.5191474E−19 | −1.9011488E−19 | 9.2611757E−18 | −2.1690769E−18 |
| A14 | −2.2070767E−22 | −1.0749966E−21 | 2.8582737E−19 | −3.7285864E−20 |
| A15 | −5.9721947E−23 | 1.4915997E−22 | 4.1177842E−20 | −1.9736606E−21 |
| A16 | 5.0004955E−25 | −1.6469097E−24 | −2.4623417E−21 | 6.6436118E−23 |

Example 3

Figure 4:
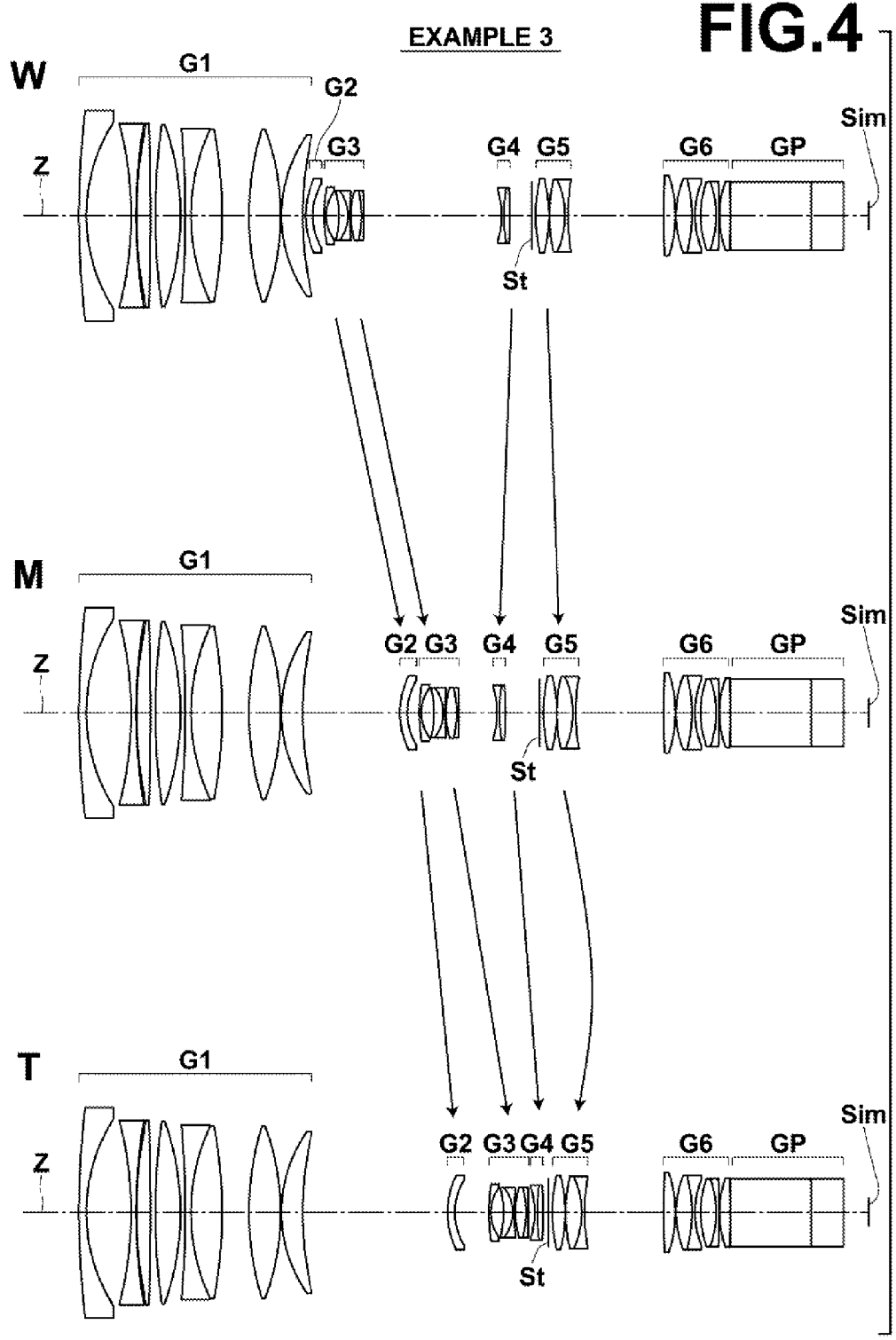
FIG. 4 is a sectional diagram illustrating the lens configuration of a zoom lens in Example 3 of the present invention.

FIG. 4 is a diagram illustrating the lens configuration of a zoom lens in Example 3. The group configuration, the schematic configuration of lenses in each lens group and the position of aperture stop St in the zoom lens of Example 3 are similar to those of Example 1, which have been described already. Table 7, Table 8 and Table 9 show the basic lens data, specification and variable surface distances, and aspherical coefficients of the zoom lens in Example 3, respectively. FIG. 8, Sections A through L are aberration diagrams of the zoom lens in Example 3.

TABLE 7

| Si | Ri | Di | Ndj | vdj |
|---|---|---|---|---|
| *1 | 381.1125 | 3.00 | 1.80400 | 46.58 |
| 2 | 71.5036 | 18.21 | | |
| 3 | −149.5273 | 2.04 | 1.88300 | 40.76 |
| 4 | 221.2226 | 0.15 | | |
| 5 | 177.6722 | 5.89 | 1.84661 | 23.78 |
| 6 | −1370.4304 | 2.00 | | |
| 7 | 267.4912 | 10.25 | 1.48749 | 70.23 |
| 8 | −110.0303 | 1.95 | | |
| 9 | −390.4320 | 2.30 | 1.62004 | 36.26 |
| 10 | 83.8898 | 12.67 | 1.43875 | 94.93 |
| 11 | −188.7612 | 11.13 | | |
| 12 | 119.6232 | 12.88 | 1.43387 | 95.20 |
| 13 | −101.2366 | 0.33 | | |
| *14 | 56.2252 | 8.70 | 1.59522 | 67.74 |
| 15 | 144.4949 | DD[15] | | |
| *16 | 33.1789 | 3.00 | 1.83481 | 42.73 |
| 17 | 25.3077 | DD[17] | | |

TABLE 7-continued

| Si | Ri | Di | Ndj | vdj |
|---|---|---|---|---|
| 18 | 69.5282 | 0.80 | 1.89800 | 34.00 |
| 19 | 17.0850 | 5.19 | | |
| 20 | −38.9084 | 3.72 | 1.80809 | 22.76 |
| 21 | −16.4933 | 0.80 | 1.77250 | 49.60 |
| 22 | 220.6378 | 0.25 | | |
| 23 | 34.3707 | 4.43 | 1.58144 | 40.75 |
| 24 | −42.0042 | 0.90 | 1.72916 | 54.68 |
| 25 | −271.1257 | DD[25] | | |
| 26 | −34.8897 | 1.00 | 1.88300 | 40.76 |
| 27 | 80.8227 | 2.34 | 1.92286 | 18.90 |
| 28 | −210.3084 | DD[28] | | |
| 29(St) | ∞ | 1.51 | | |
| *30 | 61.9886 | 5.50 | 1.84978 | 42.96 |
| 31 | −57.0623 | 0.10 | | |
| 32 | 63.6571 | 6.56 | 1.55899 | 60.74 |
| 33 | −35.3275 | 1.20 | 1.83400 | 37.16 |
| 34 | 83.6579 | DD[34] | | |
| 35 | 273.4894 | 4.82 | 1.62164 | 58.72 |
| 36 | −51.2585 | 0.30 | | |
| 37 | 39.9107 | 6.50 | 1.53597 | 63.62 |
| 38 | −56.2366 | 1.20 | 1.88300 | 40.76 |
| 39 | 36.0261 | 2.31 | | |
| 40 | 41.0295 | 6.39 | 1.49700 | 81.54 |
| 41 | −39.7608 | 1.20 | 1.82179 | 39.55 |
| 42 | −263.2496 | 0.10 | | |
| 43 | 42.1360 | 4.49 | 1.59522 | 67.74 |
| 44 | −259.1695 | 0.00 | | |
| 45 | ∞ | 33.00 | 1.60859 | 46.44 |
| 46 | ∞ | 13.20 | 1.51633 | 64.10 |
| 47 | ∞ | 10.36 | | |

TABLE 8

| | WIDE ANGLE END | MIDDLE | TELEPHOTO END |
|---|---|---|---|
| ZOOM RATIO | 1.0 | 3.1 | 16.5 |
| f | 7.71 | 23.66 | 127.16 |
| Bf | 39.58 | 39.58 | 39.58 |
| FNo. | 1.85 | 1.86 | 2.90 |
| 2ω | 75.4 | 26.2 | 5.0 |
| DD[15] | 1.16 | 39.75 | 59.09 |
| DD[17] | 4.76 | 4.91 | 14.02 |
| DD[25] | 56.34 | 15.74 | 2.63 |
| DD[28] | 8.95 | 14.00 | 2.27 |
| DD[34] | 39.09 | 35.89 | 32.29 |

TABLE 9

| SURFACE NUMBER | 1 | 14 | 16 | 30 |
|---|---|---|---|---|
| KA | −1.1446585E+02 | 9.4548358E−01 | 1.0000000E+00 | 1.0000000E+00 |
| A3 | −4.7200354E−07 | 1.0995953E−08 | 8.4829637E−06 | −7.7231759E−07 |
| A4 | 1.5232490E−07 | −2.8962426E−07 | −2.4093719E−06 | −2.0311568E−06 |
| A5 | 1.0867916E−07 | 2.0638953E−08 | 3.0334991E−08 | −4.8204136E−08 |
| A6 | −1.4563200E−08 | −1.4973715E−09 | −4.3174749E−09 | 5.1847746E−09 |
| A7 | 9.4863433E−10 | 1.5986277E−11 | −3.8480689E−11 | −5.9761410E−11 |
| A8 | −3.2868810E−11 | 1.4911250E−12 | 8.6531737E−12 | −5.7808892E−12 |
| A9 | 5.2646019E−13 | 1.6942358E−13 | 2.7149516E−13 | −4.7353774E−14 |
| A10 | −5.0300263E−15 | −2.1381474E−14 | −2.1529049E−14 | 6.8941053E−15 |
| A11 | 4.1944611E−16 | 7.1639241E−16 | −3.2365538E−15 | 4.1453524E−16 |
| A12 | −2.0274039E−17 | −3.7044917E−18 | −9.4465216E−17 | 1.0184428E−17 |
| A13 | 3.5191474E−19 | −1.9011488E−19 | 9.2611757E−18 | −2.1690769E−19 |
| A14 | −2.2070767E−22 | −1.0749966E−21 | 2.8582737E−19 | −3.7285864E−20 |
| A15 | −5.9721947E−23 | 1.4915997E−22 | 4.1177842E−20 | −1.9736606E−21 |
| A16 | 5.0004955E−25 | −1.6469097E−24 | −2.4623417E−21 | 6.6436118E−23 |

Example 4

Figure 5:
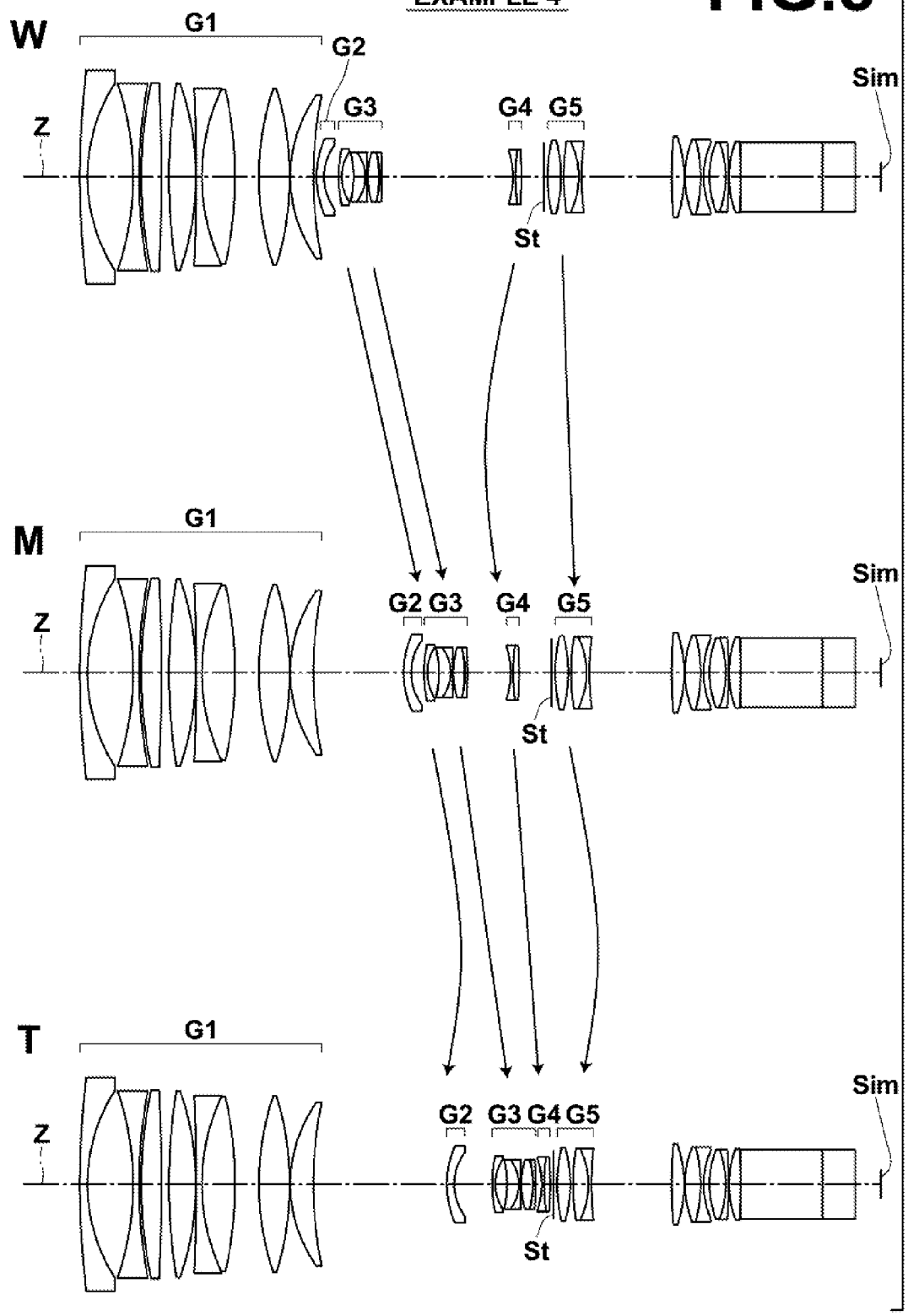
FIG. 5 is a sectional diagram illustrating the lens configuration of a zoom lens in Example 4 of the present invention.

FIG. 5 is a diagram illustrating the lens configuration of a zoom lens in Example 4. The group configuration, the schematic configuration of lenses in the each lens group and the position of aperture stop St in the zoom lens of Example 4 are similar to those of Example 1, which have been described already. However, Example 4 differs from Example 1 in that lens L34 and lens L35 are not cemented together. Table 10, Table 11 and Table 12 show the basic lens data, specification and variable surface distances, and aspherical coefficients of the zoom lens in Example 4, respectively. FIG. 9, Sections A through L are aberration diagrams of the zoom lens in Example 4.

TABLE 10

| Si | Ri | Di | Ndj | vdj |
|---|---|---|---|---|
| *1 | 377.5280 | 3.00 | 1.77250 | 49.60 |
| 2 | 70.3516 | 18.36 | | |
| 3 | −116.7899 | 2.37 | 1.83481 | 42.73 |
| 4 | 202.4192 | 0.85 | | |
| 5 | 173.9110 | 8.34 | 1.84661 | 23.78 |
| 6 | −737.4878 | 3.01 | | |
| 7 | 237.7869 | 10.78 | 1.48749 | 70.23 |
| 8 | −115.4508 | 0.16 | | |
| 9 | −805.1842 | 2.30 | 1.65550 | 33.18 |
| 10 | 83.6826 | 13.49 | 1.43875 | 94.93 |
| 11 | −153.8597 | 9.55 | | |
| 12 | 112.2089 | 12.43 | 1.43387 | 95.20 |
| 13 | −119.9041 | 0.15 | | |
| *14 | 55.0829 | 9.42 | 1.59522 | 67.74 |
| 15 | 161.0490 | DD[15] | | |
| *16 | 36.5073 | 3.02 | 1.88301 | 36.05 |
| 17 | 21.7393 | DD[17] | | |
| 18 | 55.6666 | 1.24 | 1.91082 | 35.25 |
| 19 | 18.3589 | 4.72 | | |
| 20 | −41.2319 | 4.69 | 1.80809 | 22.76 |
| 21 | −16.6262 | 0.80 | 1.77134 | 50.87 |
| 22 | 1022.7966 | 0.26 | | |
| 23 | 34.0694 | 4.47 | 1.56708 | 42.42 |
| 24 | −47.2607 | 0.30 | | |
| 25 | −37.5617 | 0.90 | 1.71373 | 55.81 |
| 26 | −192.0186 | DD[26] | | |
| 27 | −33.1377 | 1.00 | 1.88300 | 40.76 |
| 28 | 84.1516 | 2.37 | 1.92286 | 18.90 |
| 29 | −157.6119 | DD[29] | | |

TABLE 10-continued

| Si | Ri | Di | Ndj | vdj |
|---|---|---|---|---|
| 30(St) | ∞ | 1.51 | | |
| *31 | 62.7873 | 5.40 | 1.84747 | 43.25 |
| 32 | −55.5224 | 1.11 | | |
| 33 | 84.5516 | 6.19 | 1.55899 | 61.49 |
| 34 | −32.7553 | 1.20 | 1.83501 | 36.02 |
| 35 | 116.4936 | DD[35] | | |
| 36 | 187.8568 | 5.02 | 1.56528 | 61.78 |
| 37 | −50.5936 | 0.30 | | |
| 38 | 39.9450 | 6.34 | 1.53352 | 63.71 |
| 39 | −58.5107 | 1.20 | 1.88300 | 40.76 |
| 40 | 34.1388 | 2.37 | | |
| 41 | 40.0319 | 6.52 | 1.49700 | 81.54 |
| 42 | −39.7262 | 1.20 | 1.83501 | 43.35 |
| 43 | −192.9357 | 0.10 | | |
| 44 | 40.4831 | 4.69 | 1.59522 | 67.74 |
| 45 | −254.2655 | 0.00 | | |
| 46 | ∞ | 33.00 | 1.60859 | 46.44 |
| 47 | ∞ | 13.20 | 1.51633 | 64.10 |
| 48 | ∞ | 10.36 | | |

TABLE 11

| | WIDE ANGLE END | MIDDLE | TELEPHOTO END |
|---|---|---|---|
| ZOOM RATIO | 1.0 | 3.1 | 16.5 |
| f | 7.61 | 23.35 | 125.52 |
| Bf | 39.58 | 39.58 | 39.58 |
| FNo. | 1.85 | 1.86 | 2.90 |
| 2ω | 76.2 | 26.6 | 5.2 |
| DD[15] | 1.33 | 36.33 | 53.63 |
| DD[17] | 5.88 | 5.18 | 15.43 |
| DD[26] | 52.79 | 17.55 | 2.49 |
| DD[29] | 9.04 | 13.05 | 1.35 |
| DD[35] | 36.26 | 33.18 | 32.39 |

TABLE 12

| SURFACE NUMBER | 1 | 14 | 16 | 31 |
|---|---|---|---|---|
| KA | −1.1446585E+02 | 9.4548358E−01 | 1.0000000E+00 | 1.0000000E+00 |
| A3 | −4.7200354E−07 | 1.0995953E−08 | 8.4829637E−06 | −7.7231759E−07 |
| A4 | 1.5232490E−07 | −2.8962426E−07 | −2.4093719E−06 | −2.0311568E−06 |
| A5 | 1.0867916E−07 | 2.0638953E−08 | 3.0334991E−08 | −4.8204136E−08 |
| A6 | −1.4563200E−08 | −1.4973715E−09 | −4.3174749E−09 | 5.1847746E−09 |
| A7 | 9.4863433E−10 | 1.5986277E−11 | −3.8480689E−11 | −5.9761410E−11 |
| A8 | −3.2868810E−11 | 1.4911250E−12 | 8.6531737E−12 | −5.7808892E−12 |
| A9 | 5.2646019E−13 | 1.6942358E−13 | 2.7149516E−13 | −4.7353774E−14 |
| A10 | −5.0300263E−15 | −2.1381474E−14 | −2.1529049E−14 | 6.8941053E−15 |
| A11 | 4.1944611E−16 | 7.1639241E−16 | −3.2365538E−15 | 4.1453524E−16 |
| A12 | −2.0274039E−17 | −3.7044917E−18 | −9.4465216E−17 | 1.0184428E−17 |
| A13 | 3.5191474E−19 | −1.9011488E−19 | 9.2611757E−18 | −2.1690769E−19 |
| A14 | −2.2070767E−22 | −1.0749966E−21 | 2.8582737E−19 | −3.7285864E−20 |
| A15 | −5.9721947E−23 | 1.4915997E−22 | 4.1177842E−20 | −1.9736606E−21 |
| A16 | 5.0004955E−25 | −1.6469097E−24 | −2.4623417E−21 | 6.6436118E−23 |

Table 13 shows the focal length of each lens group for d-line, values related to conditional expressions (1) through (3), and values corresponding to conditional expressions (4) through (6) of the zoom lenses in Examples 1 through 4. In Table 13, f1 represents the focal length of first lens group G1, f2 represents the focal length of second lens group G2, f3 represents the focal length of third lens group G3, f4 represents the focal length of fourth lens group G4, f5 represents the focal length of fifth lens group G5, and f6 represents the focal length of sixth lens group G6.

TABLE 13

| | EXAMPLE 1 | EXAMPLE 2 | EXAMPLE 3 | EXAMPLE 4 |
|---|---|---|---|---|
| f1 | 64.90 | 64.82 | 65.73 | 58.74 |
| f2 | −132.10 | −131.99 | −154.60 | −67.32 |
| f3 | −23.09 | −23.12 | −22.70 | −27.88 |
| f4 | −49.88 | −50.06 | −49.43 | −49.90 |
| f5 | 45.35 | 45.35 | 44.79 | 45.32 |
| f6 | 49.09 | 49.01 | 48.74 | 48.18 |
| D3T | 3.65 | 3.73 | 2.63 | 2.49 |
| D3W | 56.24 | 56.13 | 56.34 | 52.79 |
| D5T | 32.34 | 32.36 | 32.29 | 32.39 |
| D5W | 38.79 | 38.96 | 39.09 | 36.26 |
| D2W | 4.85 | 4.94 | 4.76 | 5.88 |
| D2T | 14.94 | 14.94 | 14.02 | 15.43 |
| f6/f5 | 1.08 | 1.08 | 1.09 | 1.06 |
| ft/f1 | 1.98 | 1.99 | 1.93 | 2.14 |
| ft/f2 | −0.97 | −0.98 | −0.82 | −1.86 |

As these data show, the zoom lenses in Examples 1 through 4 have a small F-number of 1.85 at the wide angle end, and the full angle of view at the wide angle end is about 75°, which is wide. The configuration of the zoom lenses is made compact while the zoom ratio is 16.5 times. Further, the zoom lenses have high performance in which various aberrations are excellently corrected.

Figure 10:
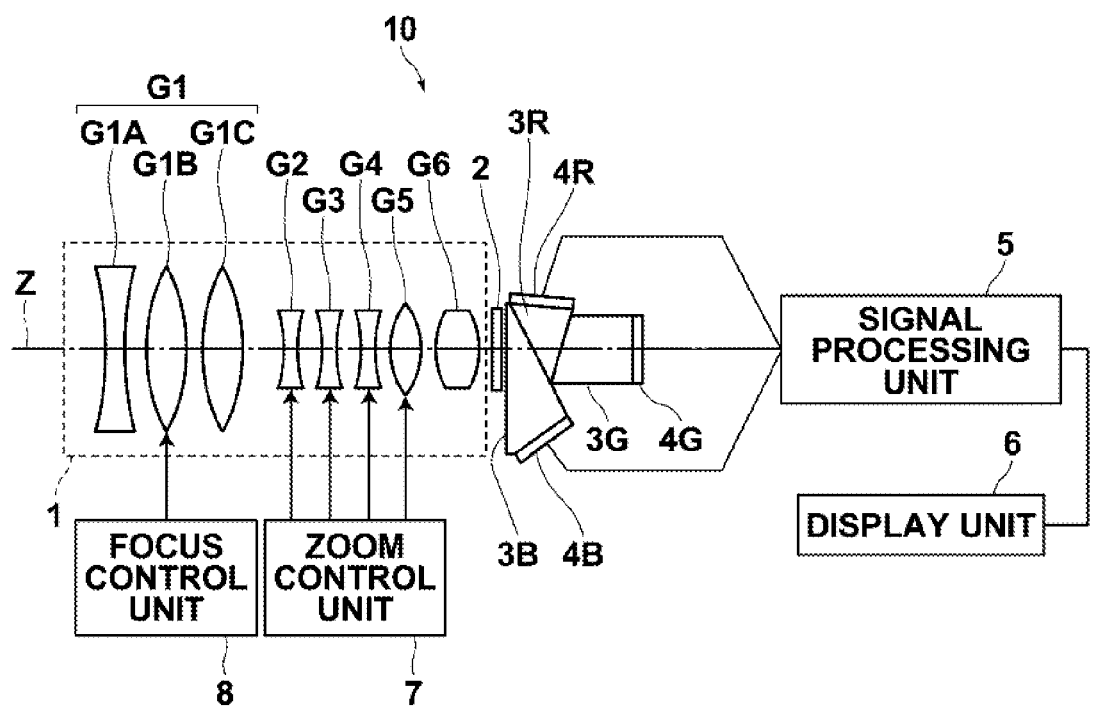
FIG. 10 is a schematic diagram illustrating the configuration of an imaging apparatus according to an embodiment of the present invention.

Next, an imaging apparatus according to an embodiment of the present invention will be described with reference to FIG. 10. FIG. 10 is a schematic diagram illustrating the configuration of a TV camera 10 using the zoom lens 1 according to an embodiment of the present invention, as an example of an imaging apparatus according to an embodiment of the present invention. In FIG. 10, 1A-th lens group G1A, 1B-th lens group G1B, 1C-th lens group G1C, and second lens group G2 through sixth lens group G6 included in the zoom lens 1 are schematically illustrated.

The TV camera 10 includes the zoom lens 1, a filter 2 having a function, such as a low-pass filter and an infrared ray cut filter, which is arranged toward the image side of the zoom lens 1, each prism 3R, 3G and 3B of a color separation prism, which is arranged toward the image side of the filter 2, and imaging devices 4R, 4G and 4B, which are provided on end surfaces of prisms 3R, 3G and 3B, respectively. Imaging devices 4R, 4G and 4B convert an optical image formed by the zoom lens 1 into electrical signals. For example, a CCD, a CMOS (Complementary Metal Oxide Semiconductor) or the like may be used as imaging devices 4R, 4G and 4B. Imaging devices 4R, 4G and 4B are arranged in such a manner that their imaging surfaces match the image plane of the zoom lens 1.

Further, the TV camera 10 includes a signal processing unit 5, which performs operation processing on signals output from imaging devices 4R, 4G and 4B, a display unit 6, which displays an image formed by the signal processing unit 5, a zoom control unit 7, which controls magnification change of the zoom lens 1, and a focus control unit 8, which controls focus of the zoom lens 1. The TV camera 10 illustrated in FIG. 10 is a so-called 3CCD-type imaging apparatus including three imaging devices. However, the imaging apparatus of the present invention is not limited to this imaging apparatus. The imaging apparatus of the present invention may image the whole wavelength band by an imaging device. Further, FIG. 10 illustrates an example in which focus is controlled by moving 1B-th lens group G1B and magnification change is controlled by moving second lens group G2 through fifth lens group G5. However, the lens groups used for focusing or changing magnification in the present invention are not necessarily limited to those illustrated in FIG. 10.

So far, the present invention has been described by using embodiments and examples. However, the present invention is not limited to the aforementioned embodiments nor examples, and various modifications are possible. For example, the values of a curvature radius, a distance between surfaces, a refractive index, an Abbe number, and aspherical coefficients of each lens are not limited to the values shown in the examples, but may be other values.

Further, in the embodiment of the imaging apparatus, the TV camera was used as an example, and illustrated in the drawing and explained. However, the imaging apparatus of the present invention is not limited to the TV camera. For example, the imaging apparatus of the present invention may be applied also to a video camera, a digital camera, a camera for surveillance, a camera for film making, a camera for broadcasting and the like.

What is claimed is:

1. A zoom lens consisting of six lens groups of, in order from the object side:
    a first lens group having positive refractive power:
    a second lens group having negative refractive power;
    a third lens group having negative refractive power;
    a fourth lens group having negative refractive power;
    a fifth lens group having positive refractive power; and
    a sixth lens group having positive refractive power,
    wherein the first lens group and the sixth lens group are fixed with respect to an image plane, and a distance between the first lens group and the second lens group increases, a distance between the second lens group and the third lens group changes, and a distance between the third lens group and the fourth lens group changes, and a distance between the fourth lens group and the fifth lens group changes, and a distance between the fifth lens group and the sixth lens group changes during magnification change from a wide angle end to a telephoto end.

2. The zoom lens, as defined in claim 1, wherein the following conditional expression (1) is satisfied:

$$D3T<D3W \qquad (1),$$

where
    D3T is a distance in air on an optical axis between the third lens group and the fourth lens group at the telephoto end, and
    D3W is a distance in air on the optical axis between the third lens group and the fourth lens group at the wide angle end.

3. The zoom lens, as defined in claim 1, wherein the following conditional expression (2) is satisfied:

$$D5T<D5W \qquad (2),$$

where
    D5T is a distance in air on an optical axis between the fifth lens group and the sixth lens group at the telephoto end, and
    D5W is a distance in air on the optical axis between the fifth lens group and the sixth lens group at the wide angle end.

4. The zoom lens, as defined in claim 1, wherein the following conditional expression (3) is satisfied:

$$D2W<D2T \qquad (3),$$

where
    D2W is a distance in air on an optical axis between the second lens group and the third lens group at the wide angle end, and
    D2T is a distance in air on the optical axis between the second lens group and the third lens group at the telephoto end.

5. The zoom lens, as defined in claim 1, wherein the following conditional expression (4) is satisfied:

$$0.8<f6/f5<1.3 \qquad (4),$$

where
    f6 is a focal length of the sixth lens group, and
    f5 is a focal length of the fifth lens group.

6. The zoom lens, as defined in claim 1, wherein the following conditional expression (5) is satisfied:

$$1.5<ft/f1<3.0 \qquad (5),$$

where
    ft is a focal length of an entire system at the telephoto end, and
    f1 is a focal length of the first lens group.

7. The zoom lens, as defined in claim 1, wherein the following conditional expression (6) is satisfied:

$$-4.0<ft/f2<-0.5 \qquad (6),$$

where
    ft is a focal length of an entire system at the telephoto end, and
    f2 is a focal length of the second lens group.

8. The zoom lens, as defined in claim 1,
    wherein a stop is arranged closer to the object side than a lens surface closest to the image side in the fifth lens group, and
    wherein the stop and the fifth lens group move as one body during magnification change from the wide angle end to the telephoto end.

9. The zoom lens, as defined in claim 1, wherein the second lens group consists of a negative meniscus lens that includes at least one aspheric surface and has its concave surface facing the image side.

10. The zoom lens, as defined in claim 1, wherein the fifth lens group consists of, in order from the object side, a biconvex lens and a cemented lens in which a biconvex lens and a biconcave lens are cemented together in order from the object side.

11. The zoom lens, as defined in claim 1,
wherein the third lens group consists of, in order from the object side, a negative meniscus lens with its concave surface facing the image side and two cemented lenses, or
wherein the third lens group consists of, in order from the object side, a negative meniscus lens with its concave surface facing the image side, a cemented lens, a positive lens and a negative lens.

12. The zoom lens, as defined in claim 5, wherein the following conditional expression (4-1) is satisfied:

$$0.9 < f6/f5 < 1.2 \qquad (4\text{-}1).$$

13. The zoom lens, as defined in claim 6, wherein the following conditional expression (5-1) is satisfied:

$$1.8 < ft/f1 < 2.5 \qquad (5\text{-}1).$$

14. The zoom lens, as defined in claim 7, wherein the following conditional expression (6-1) is satisfied:

$$-3.0 < ft/f2 < -0.6 \qquad (6\text{-}1).$$

15. An imaging apparatus comprising:
the zoom lens, as defined in claim 1.

* * * * *